US009767700B1

(12) United States Patent
Vander Lind

(10) Patent No.: US 9,767,700 B1
(45) Date of Patent: Sep. 19, 2017

(54) CONTROL STRATEGY FOR MULTIPLE KITES ON A SINGLE GROUND POWER UNIT

(71) Applicant: X Development LLC, Mountain View, CA (US)

(72) Inventor: Damon Vander Lind, Alameda, CA (US)

(73) Assignee: X Development LLC, Mountain View, CA (US)

(*) Notice: Subject to any disclaimer, the term of this patent is extended or adjusted under 35 U.S.C. 154(b) by 0 days.

(21) Appl. No.: 14/964,271

(22) Filed: Dec. 9, 2015

Related U.S. Application Data

(60) Provisional application No. 62/260,246, filed on Nov. 25, 2015.

(51) Int. Cl.
*G08G 5/00* (2006.01)
*B64C 31/06* (2006.01)
*G05D 1/10* (2006.01)

(52) U.S. Cl.
CPC .......... *G08G 5/0043* (2013.01); *B64C 31/06* (2013.01); *G05D 1/101* (2013.01); *G08G 5/0039* (2013.01)

(58) Field of Classification Search
CPC ...... B64C 31/06; G05D 1/101; G08G 5/0043; G08G 5/0039
USPC .......................................................... 701/2, 3
See application file for complete search history.

(56) References Cited

U.S. PATENT DOCUMENTS

| 6,254,034 | B1* | 7/2001 | Carpenter | A63H 27/08 244/153 R |
| 6,327,994 | B1* | 12/2001 | Labrador | B01D 61/10 114/382 |
| 7,861,973 | B1 | 1/2011 | Olson | |
| 9,080,550 | B2 | 7/2015 | Goldstein | |
| 2002/0040948 | A1* | 4/2002 | Ragner | A63H 27/002 244/153 R |
| 2007/0176432 | A1* | 8/2007 | Rolt | B64C 39/022 290/55 |
| 2010/0013225 | A1* | 1/2010 | Ippolito | F03D 3/062 290/44 |
| 2010/0013226 | A1* | 1/2010 | Blumer | B64B 1/50 290/44 |
| 2010/0032948 | A1* | 2/2010 | Bevirt | F03D 1/00 290/44 |
| 2010/0032956 | A1* | 2/2010 | Varrichio | F03D 5/00 290/55 |
| 2010/0221112 | A1* | 9/2010 | Bevirt | F03D 5/00 416/135 |
| 2010/0283253 | A1* | 11/2010 | Bevirt | F03D 1/02 290/55 |

(Continued)

*Primary Examiner* — Tyler J Lee
(74) *Attorney, Agent, or Firm* — McDonnell Boehnen Hulbert & Berghoff LLP

(57) ABSTRACT

Methods and systems described herein relate to power generation control for an aerial vehicle. An example method may involve determining an asynchronous flight pattern for two or more aerial vehicles, where the asynchronous flight pattern includes a respective flight path for each of the two or more aerial vehicles; and operating each of the aerial vehicles in a crosswind flight substantially along its respective flight path, where each aerial vehicle generates electrical power over time in a periodic profile, and where the power profile of each aerial vehicle is out of phase with respect to the power profile generated by each of the other aerial vehicles.

18 Claims, 16 Drawing Sheets

(56) References Cited

U.S. PATENT DOCUMENTS

| | | | | |
|---|---|---|---|---|
| 2010/0295303 A1* | 11/2010 | Lind | ............... | B64C 39/022 290/44 |
| 2010/0295320 A1* | 11/2010 | Bevirt | ............... | B64C 39/022 290/55 |
| 2011/0121570 A1* | 5/2011 | Bevirt | ............... | F03D 5/06 290/44 |
| 2011/0180667 A1* | 7/2011 | O'Brien | ............... | B64C 39/022 244/135 R |
| 2011/0266395 A1* | 11/2011 | Bevirt | ............... | F03D 5/00 244/155 R |
| 2012/0104763 A1* | 5/2012 | Lind | ............... | B64C 31/06 290/55 |
| 2012/0112008 A1* | 5/2012 | Holifield | ............... | B64C 27/02 244/155 A |
| 2013/0134261 A1* | 5/2013 | Goldstein | ............... | F03D 9/002 244/155 A |
| 2013/0221154 A1* | 8/2013 | Vander Lind | ............... | B64C 31/06 244/54 |
| 2013/0221679 A1* | 8/2013 | Vander Lind | ............... | B64C 31/06 290/55 |
| 2014/0210212 A1* | 7/2014 | Hardy | ............... | F03D 5/00 290/55 |
| 2014/0326831 A1* | 11/2014 | Vander Lind | ............... | B64C 31/06 244/155 A |
| 2015/0041598 A1* | 2/2015 | Nugent | ............... | H02J 17/00 244/53 R |
| 2015/0097079 A1* | 4/2015 | Frolov | ............... | B64D 33/00 244/54 |
| 2015/0153741 A1 | 6/2015 | North et al. | | |
| 2015/0183517 A1* | 7/2015 | Jensen | ............... | B64C 39/022 244/76 R |
| 2015/0251755 A1 | 9/2015 | Schaefer | | |
| 2015/0298806 A1* | 10/2015 | Vander Lind | ............... | F03D 9/002 518/704 |

* cited by examiner

CONTROL STRATEGY FOR MULTIPLE KITES ON A SINGLE GROUND POWER UNIT

CROSS REFERENCE TO RELATED APPLICATION

The present application claims priority to U.S. Provisional patent application Ser. No. 62/260,246 filed on Nov. 25, 2015 and entitled "Control Strategy for Multiple Kites on a Single Ground Power Unit," the entire contents of which are herein incorporated by reference.

BACKGROUND

Unless otherwise indicated herein, the materials described in this section are not prior art to the claims in this application and are not admitted to be prior art by inclusion in this section.

Power generation systems may convert chemical and/or mechanical energy (e.g., kinetic energy) to electrical energy for various applications, such as utility systems. As one example, a wind energy system may convert kinetic wind energy to electrical energy.

SUMMARY

Methods and systems for managing power generation of a plurality of aerial vehicles operating in a crosswind flight orientation are described herein. Beneficially, embodiments described herein may help in reducing the overall peak power that may flow through a system. Further, embodiments described herein may help to reduce fluctuations in power output.

In one aspect, a method may involve determining an asynchronous flight pattern for two or more aerial vehicles, where the asynchronous flight pattern includes a respective flight path for each of the two or more aerial vehicles; and operating each of the aerial vehicles in a crosswind flight substantially along its respective flight path, where each aerial vehicle generates electrical power over time in a periodic profile, and where the power profile of each aerial vehicle is out of phase with respect to the power profile generated by each of the other aerial vehicles.

In another aspect, a method may involve determining at least one preferred phase differential between periodic power profiles generated by two of two or more aerial vehicles; based at least on the at least one preferred phase differential, determining an asynchronous flight pattern for the aerial vehicles, where the determined asynchronous flight pattern includes a respective flight path for each of the aerial vehicles; operating each of the aerial vehicles in a crosswind flight substantially along its respective flight path, where each aerial vehicle generates electrical power over time in a periodic profile, and where a phase differential between the power profiles generated by two of the aerial vehicles is substantially the preferred phase differential.

In another aspect, a method may involve determining a deployment order for two or more aerial vehicles, where each aerial vehicle is configured to operate substantially along a respective flight path to generate electrical power; assigning the deployment order to the two or more aerial vehicles; deploying the two or more aerial vehicles according to the assigned deployment order, where deploying the two or more vehicles according to the assigned deployment order includes: for an aerial vehicle in a first position of the deployment order, (i) deploying the aerial vehicle, (ii) operating the aerial vehicle in a loitering flight; for each aerial vehicle in the assigned deployment order between the aerial vehicle in the first position of the deployment order and an aerial vehicle in a last position of the deployment order, (i) determining that the preceding aerial vehicle in the assigned deployment order is operating in the loitering flight, (ii) deploying the aerial vehicle (iii) operating the aerial vehicle in a loitering flight; for the aerial vehicle in the last position of the deployment order, (i) determining that the preceding aerial vehicle in the assigned deployment order is operating in the loitering flight, (ii) deploying the aerial vehicle, (iii) operating the aerial vehicle in a crosswind flight.

In another aspect, a system may include a shared ground power unit, where the shared ground power unit comprises a battery system; two or more airborne wind turbines (AWTs), wherein each AWT includes: a tether coupled to a ground station, wherein the ground station is coupled to the shared ground power unit; and an aerial vehicle coupled to the tether, wherein the aerial vehicle is configured to operate in crosswind flight to generate electrical power.

These as well as other aspects, advantages, and alternatives, will become apparent to those of ordinary skill in the art by reading the following detailed description, with reference where appropriate to the accompanying drawings.

DETAILED DESCRIPTION

Figure 1:
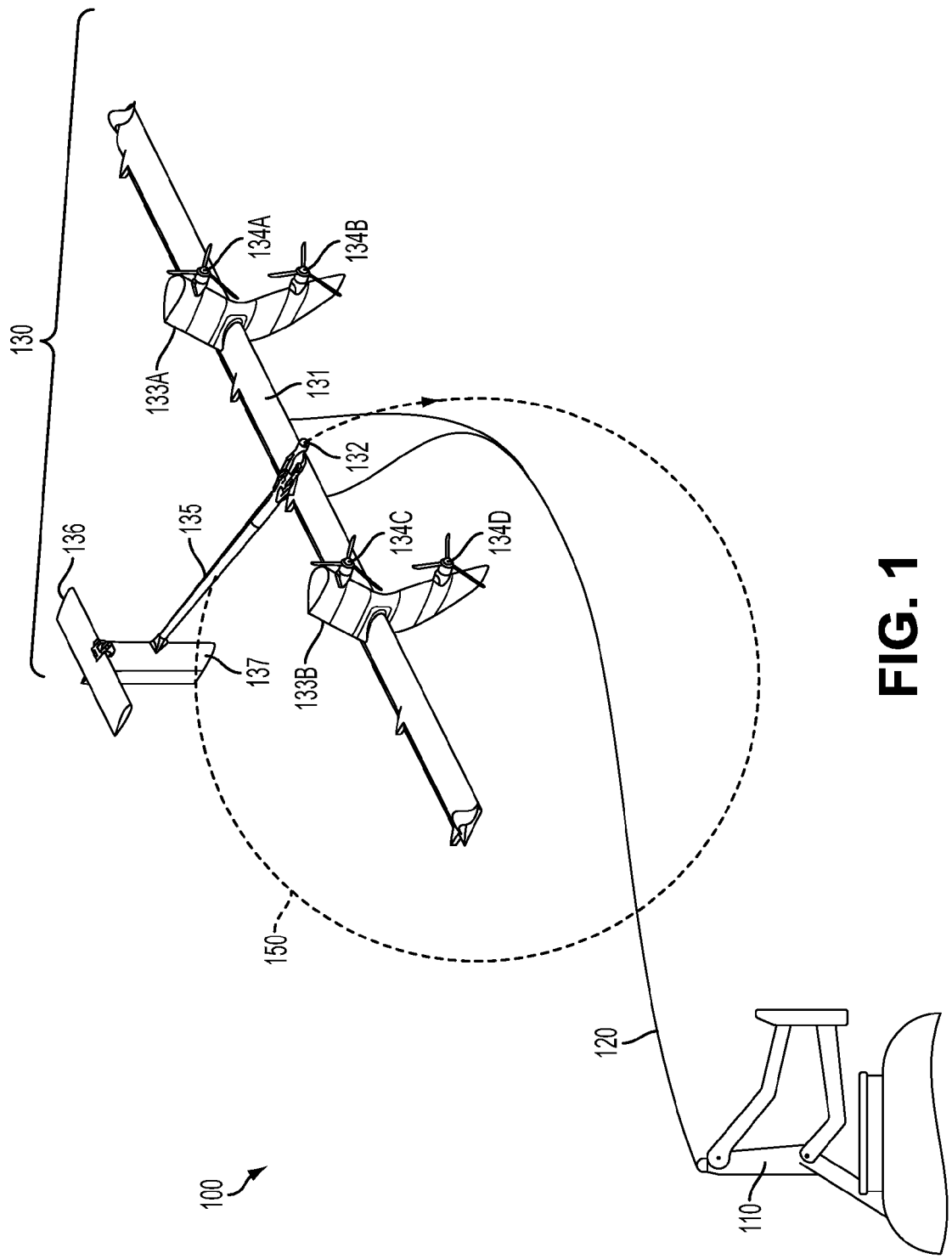
FIG. 1 depicts an Airborne Wind Turbine (AWT), according to an example embodiment.

Exemplary methods and systems are described herein. It should be understood that the word "exemplary" is used herein to mean "serving as an example, instance, or illustration." Any embodiment or feature described herein as "exemplary" or "illustrative" is not necessarily to be construed as preferred or advantageous over other embodiments or features. More generally, the embodiments described herein are not meant to be limiting. It will be readily understood that certain aspects of the disclosed methods systems and can be arranged and combined in a wide variety of different configurations, all of which are contemplated herein.

I. Overview

Illustrative embodiments relate to aerial vehicles, which may be used in a wind energy system, such as an Airborne Wind Turbine (AWT). In particular, illustrative embodiments may relate to or take the form of methods and systems for transitioning aerial vehicles between certain flight modes that facilitate conversion of kinetic energy to electrical energy.

By way of background, an AWT may include an aerial vehicle that flies in a path, such as a substantially circular path, to convert kinetic wind energy to electrical energy. In an illustrative implementation, the aerial vehicle may be connected to a ground station via a tether. While tethered, the aerial vehicle can: (i) fly at a range of elevations and substantially along the path, and return to the ground, and (ii) transmit electrical energy to the ground station via the tether. (In some embodiments, the ground station may transmit electricity to the aerial vehicle for take-off and/or landing.)

In an AWT, an aerial vehicle may rest in and/or on a ground station (or perch) when the wind is not conducive to power generation. When the wind is conducive to power generation, such as when a wind speed may be 3.5 meters per second (m/s) at an altitude of 200 meters (m), the ground station may deploy (or launch) the aerial vehicle. In addition, when the aerial vehicle is deployed and the wind is not conducive to power generation, the aerial vehicle may return to the ground station.

Moreover, in an AWT, an aerial vehicle may be configured for crosswind flight. Crosswind flight may be used to travel in a motion, such as a substantially circular motion, and thus may be the primary technique that is used to generate electrical energy. In crosswind flight, the aerial vehicle may be propelled by the wind substantially along a path to convert kinetic wind energy to electrical energy. In some embodiments, the one or more propellers of the aerial vehicle may generate electrical energy by slowing down the incident wind.

In an embodiment of a wind energy system, a ground station of an AWT may be connected to a ground power unit, which may connect the ground station to an electric power grid using grid connections. In this arrangement, the power generated by an aerial vehicle of the AWT may flow, via a tether, from the aerial vehicle to the ground station. The generated power may then flow from the ground station to the ground power unit, where it may be transmitted to the electrical grid.

Within examples, more than one AWT may be connected to a shared ground power unit, to decrease infrastructure costs for instance. Generally, the cost of electrical components, which are typically sized to handle the peak power that may flow through the system, increases as the components' power rating increases. As such, connecting more than one AWT to a shared ground power unit may increase the cost of at least the grid connections in the ground power unit, as the peak power that may flow through the system may increase as the number of aerial vehicles connected to the shared ground station increases.

For example, the peak power that may flow through the system may increase when a plurality of aerial vehicles are deployed at the same time. Additionally, if multiple AWTs sharing a ground power unit are flown in a synchronous or near-synchronous pattern, the peak power transmission from each AWT may coincide in time, and thus may result in a very large peak power handling requirement of the ground power unit.

Consequently, the cumulative instantaneous power flow, into the shared ground power unit, may fluctuate due to power of different characteristics (from each of the aerial vehicles) aggregating to form the cumulative power flow. Therefore, the power received at the ground power unit may be aperiodic, irregular, and may ripple, which may result in the electrical grid receiving a fluctuating power input from the shared ground power unit.

Accordingly, each of the aerial vehicles connected to a shared ground power unit may be deployed asynchronously. In asynchronous deployment, a first aerial vehicle may be deployed. However, rather than entering crosswind flight, the first aerial vehicle may enter loitering flight, where the aerial vehicle may generate as much energy as it is using resulting in zero or near-zero load on the shared ground power unit. While the first aerial vehicle is in loitering flight, each additional aerial vehicle connected to the shared ground power unit may asynchronously launch and enter loitering flight, until all of the aerial vehicles connected to a shared ground power unit have launched. Note that the last aerial vehicle may be deployed directly into crosswind flight. Thus, by staggering the deployment of the aerial vehicles, the peak power that may flow through the system may be limited to the peak power required to launch a single aerial vehicle.

Further, after the last aerial vehicle has transitioned into crosswind flight, the other aerial vehicles may also transition to crosswind flight. While in crosswind flight, the aerial vehicles may be operable to fly in a determined asynchronous pattern. More specifically, the flight path of each deployed aerial vehicle may be determined such that the phase of the power profile of each aerial vehicle may be out of phase with respect to the power profile of each of the other aerial vehicles. As such, the overall peak power in the system may be decreased as the aerial vehicles fly in a determined asynchronous pattern. The peak power in the system may be decreased by determining the flight path of each aerial vehicle such that the peak power generated by each aerial vehicle may be out of phase with respect to the peak power generated by the other aerial vehicles. Further, the aerial vehicles flying in a determined asynchronous pattern may achieve a substantially regular power flow. The aerial vehicles, which may be flying in a determined asynchronous pattern, may be described as flying "in-sync".

In line with the discussion above, the aerial vehicles may generate electrical energy in crosswind flight and may thereby allow the AWTs to extract useful power from the wind. The aerial vehicles may generate electrical energy during various environmental conditions such as high wind speeds, large gusts, turbulent air, or variable wind conditions. However, at times, the environmental conditions may cause one or more of the aerial vehicles to deviate from its determined flight pattern relative to the other vehicles flying in the determined asynchronous pattern. The aerial vehicle which deviates from its determined flight pattern may be referred to as an "out-of-sync" aerial vehicle relative to the aerial vehicles flying in the determined flight pattern. As a result, the power profile of each of the one or more out-of-sync aerial vehicles may no longer be out of phase with respect to the power profile of each of the other aerial vehicles. Therefore, the peak power that may flow through the system may exceed the rated power of the electrical components. Further, the cumulative power input into the electrical grid may fluctuate.

Accordingly, at least the one or more out of sync aerial vehicles may adjust one or more of their flight settings to resynchronize with the aerial vehicles flying in the determined asynchronous pattern. Alternatively, the control system of each of the aerial vehicles connected to the shared ground power unit may adjust one or more of their flight settings such that the aerial vehicles fly in an adjusted asynchronous pattern. Thus, the power profile of each of the aerial vehicles flying in the adjusted asynchronous pattern may be out of phase with respect to the power profiles of each of the other aerial vehicles.

II. Illustrative Systems

A. Airborne Wind Turbine (AWT)

FIG. 1 depicts an AWT 100, according to an example embodiment. In particular, the AWT 100 includes a ground station 110, a tether 120, and an aerial vehicle 130. As shown in FIG. 1, the aerial vehicle 130 may be connected to the tether 120, and the tether 120 may be connected to the ground station 110. In this example, the tether 120 may be attached to the ground station 110 at one location on the ground station 110, and attached to the aerial vehicle 130 at two locations on the aerial vehicle 130. However, in other examples, the tether 120 may be attached at multiple locations to any part of the ground station 110 and/or the aerial vehicle 130.

The ground station 110 may be used to hold and/or support the aerial vehicle 130 until it is in an operational mode. The ground station 110 may also be configured to allow for the repositioning of the aerial vehicle 130 such that deploying of the device is possible. Further, the ground station 110 may be further configured to receive the aerial vehicle 130 during a landing. The ground station 110 may be formed of any material that can suitably keep the aerial vehicle 130 attached and/or anchored to the ground while in hover flight, forward flight, crosswind flight.

In addition, the ground station 110 may include one or more components (not shown), such as a winch, that may vary a length of the tether 120. For example, when the aerial vehicle 130 is deployed, the one or more components may be configured to pay out and/or reel out the tether 120. In some implementations, the one or more components may be configured to pay out and/or reel out the tether 120 to a predetermined length. As examples, the predetermined length could be equal to or less than a maximum length of the tether 120. Further, when the aerial vehicle 130 lands in the ground station 110, the one or more components may be configured to reel in the tether 120.

The tether 120 may transmit electrical energy generated by the aerial vehicle 130 to the ground station 110. In addition, the tether 120 may transmit electricity to the aerial vehicle 130 in order to power the aerial vehicle 130 for takeoff, landing, hover flight, and/or forward flight. The tether 120 may be constructed in any form and using any material which may allow for the transmission, delivery, and/or harnessing of electrical energy generated by the aerial vehicle 130 and/or transmission of electricity to the aerial vehicle 130. The tether 120 may also be configured to withstand one or more forces of the aerial vehicle 130 when the aerial vehicle 130 is in an operational mode. For example, the tether 120 may include a core configured to withstand one or more forces of the aerial vehicle 130 when the aerial vehicle 130 is in hover flight, forward flight, and/or crosswind flight. The core may be constructed of any high strength fibers. In some examples, the tether 120 may have a fixed length and/or a variable length. For instance, in at least one such example, the tether 120 may have a length of 140 meters.

The aerial vehicle 130 may be configured to fly substantially along a path 150 to generate electrical energy. The term "substantially along," as used in this disclosure, refers to exactly along and/or one or more deviations from exactly along that do not significantly impact generation of electrical energy as described herein and/or transitioning an aerial vehicle between certain flight modes as described herein.

The aerial vehicle 130 may include or take the form of various types of devices, such as a kite, a helicopter, a wing and/or an airplane, among other possibilities. The aerial vehicle 130 may be formed of solid structures of metal, plastic and/or other polymers. The aerial vehicle 130 may be formed of any material which allows for a high thrust-to-weight ratio and generation of electrical energy which may be used in utility applications. Additionally, the materials may be chosen to allow for a lightning hardened, redundant and/or fault tolerant design which may be capable of handling large and/or sudden shifts in wind speed and wind direction. Other materials may be possible as well.

The path 150 may be various different shapes in various different embodiments. For example, the path 150 may be substantially circular. And in at least one such example, the path 150 may have a radius of up to 265 meters. The term "substantially circular," as used in this disclosure, refers to exactly circular and/or one or more deviations from exactly circular that do not significantly impact generation of electrical energy as described herein. Other shapes for the path 150 may be an oval, such as an ellipse, the shape of a jelly bean, the shape of the number of 8, etc.

As shown in FIG. 1, the aerial vehicle 130 may include a main wing 131, a front section 132, rotor connectors 133A-B, rotors 134A-D, a tail boom 135, a tail wing 136, and a vertical stabilizer 137. Any of these components may be shaped in any form which allows for the use of components of lift to resist gravity and/or move the aerial vehicle 130 forward.

The main wing 131 may provide a primary lift for the aerial vehicle 130. The main wing 131 may be one or more rigid or flexible airfoils, and may include various control surfaces, such as winglets, flaps, rudders, elevators, etc. The control surfaces may be used to stabilize the aerial vehicle 130 and/or reduce drag on the aerial vehicle 130 during hover flight, forward flight, and/or crosswind flight.

The main wing 131 may be any suitable material for the aerial vehicle 130 to engage in hover flight, forward flight, and/or crosswind flight. For example, the main wing 131 may include carbon fiber and/or e-glass. Moreover, the main wing 131 may have a variety dimensions. For example, the main wing 131 may have one or more dimensions that correspond with a conventional wind turbine blade. As another example, the main wing 131 may have a span of 8 meters, an area of 4 meters squared, and an aspect ratio of 15. The front section 132 may include one or more components, such as a nose, to reduce drag on the aerial vehicle 130 during flight.

The rotor connectors 133A-B may connect the rotors 134A-D to the main wing 131. In some examples, the rotor connectors 133A-B may take the form of or be similar in form to one or more pylons. In this example, the rotor connectors 133A-B are arranged such that the rotors 134A-D are spaced between the main wing 131. In some examples, a vertical spacing between corresponding rotors (e.g., rotor 134A and rotor 134B or rotor 134C and rotor 134D) may be 0.9 meters.

The rotors 134A-D may be configured to drive one or more generators for the purpose of generating electrical energy. In this example, the rotors 134A-D may each include one or more blades, such as three blades. The one or more rotor blades may rotate via interactions with the wind and which could be used to drive the one or more generators. In addition, the rotors 134A-D may also be configured to provide a thrust to the aerial vehicle 130 during flight. With this arrangement, the rotors 134A-D may function as one or more propulsion units, such as a propeller. Although the rotors 134A-D are depicted as four rotors in this example, in other examples the aerial vehicle 130 may include any number of rotors, such as less than four rotors or more than four rotors.

The tail boom 135 may connect the main wing 131 to the tail wing 136. The tail boom 135 may have a variety of dimensions. For example, the tail boom 135 may have a length of 2 meters. Moreover, in some implementations, the tail boom 135 could take the form of a body and/or fuselage of the aerial vehicle 130. And in such implementations, the tail boom 135 may carry a payload.

The tail wing 136 and/or the vertical stabilizer 137 may be used to stabilize the aerial vehicle and/or reduce drag on the aerial vehicle 130 during hover flight, forward flight, and/or crosswind flight. For example, the tail wing 136 and/or the vertical stabilizer 137 may be used to maintain a pitch of the aerial vehicle 130 during hover flight, forward flight, and/or crosswind flight. In this example, the vertical stabilizer 137 is attached to the tail boom 135, and the tail wing 136 is located on top of the vertical stabilizer 137. The tail wing 136 may have a variety of dimensions. For example, the tail wing 136 may have a length of 2 meters. Moreover, in some examples, the tail wing 136 may have a surface area of 0.45 meters squared. Further, in some examples, the tail wing 136 may be located 1 meter above a center of mass of the aerial vehicle 130.

While the aerial vehicle 130 has been described above, it should be understood that the methods and systems described herein could involve any suitable aerial vehicle that is connected to a tether, such as the tether 120.

B. Illustrative Components of an AWT

Figure 2:
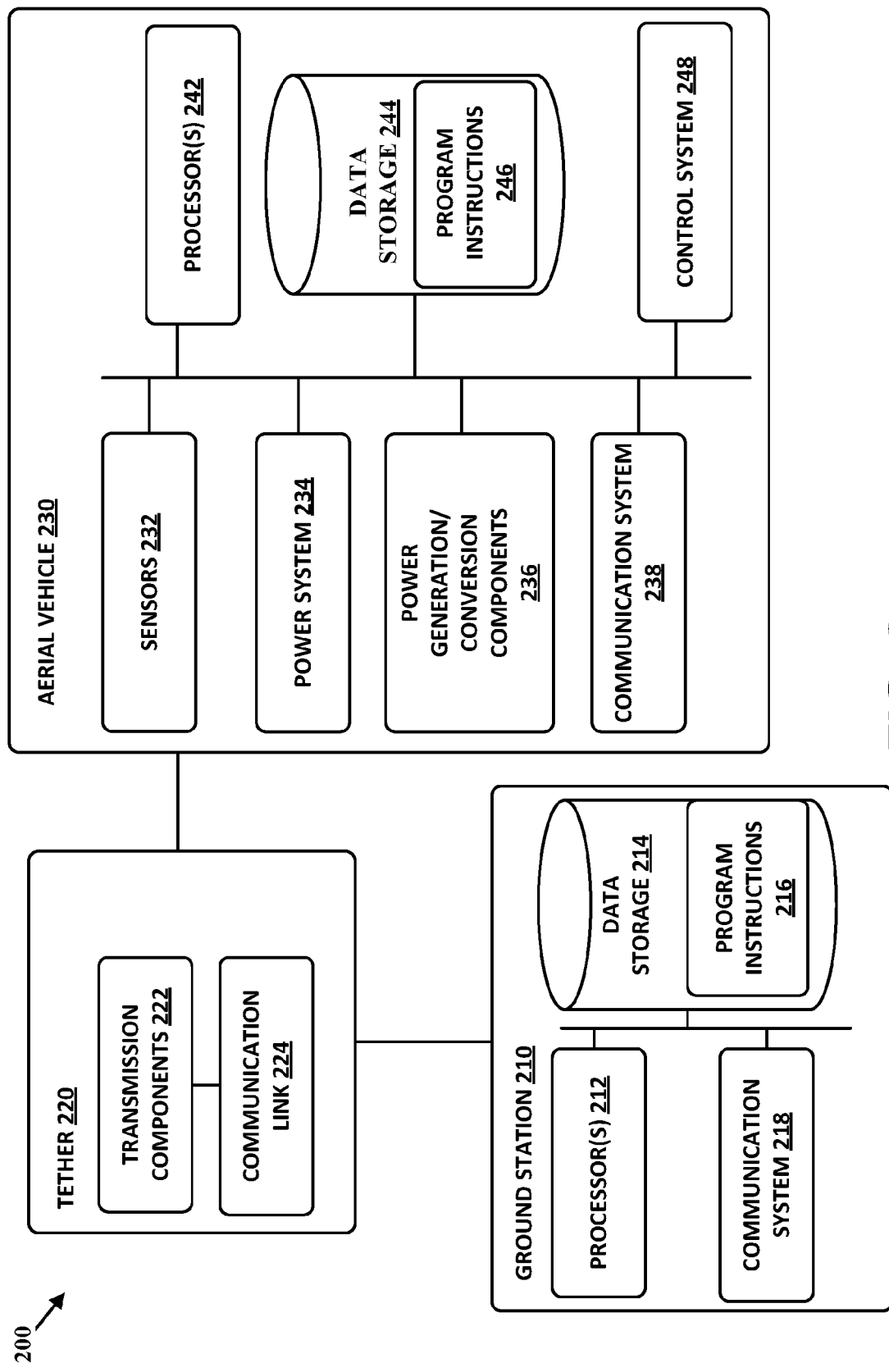
FIG. 2 is a simplified block diagram illustrating components of an AWT, according to an example embodiment.

FIG. 2 is a simplified block diagram illustrating components of the AWT 200. The AWT 200 may take the form of or be similar in form to the AWT 100. In particular, the AWT 200 includes a ground station 210, a tether 220, and an aerial vehicle 230. The ground station 210 may take the form of or be similar in form to the ground station 110, the tether 220 may take the form of or be similar in form to the tether 120, and the aerial vehicle 230 may take the form of or be similar in form to the aerial vehicle 130.

As shown in FIG. 2, the ground station 210 may include one or more processors 212, data storage 214, and program instructions 216. A processor 212 may be a general-purpose processor or a special purpose processor (e.g., digital signal processors, application specific integrated circuits, etc.). The one or more processors 212 can be configured to execute computer-readable program instructions 216 that are stored in data storage 214 and are executable to provide at least part of the functionality described herein.

The data storage 214 may include or take the form of one or more computer-readable storage media that may be read or accessed by at least one processor 212. The one or more computer-readable storage media can include volatile and/or non-volatile storage components, such as optical, magnetic, organic or other memory or disc storage, which may be integrated in whole or in part with at least one of the one or more processors 212. In some embodiments, the data storage 214 may be implemented using a single physical device (e.g., one optical, magnetic, organic or other memory or disc storage unit), while in other embodiments, the data storage 214 can be implemented using two or more physical devices.

As noted, the data storage 214 may include computer-readable program instructions 216 and perhaps additional data, such as diagnostic data of the ground station 210. As such, the data storage 214 may include program instructions to perform or facilitate some or all of the functionality described herein.

In a further respect, the ground station 210 may include a communication system 218. The communications system 218 may include one or more wireless interfaces and/or one or more wireline interfaces, which allow the ground station 210 to communicate via one or more networks. Such wireless interfaces may provide for communication under one or more wireless communication protocols, such as Bluetooth, WiFi (e.g., an IEEE 802.11 protocol), Long-Term Evolution (LTE), WiMAX (e.g., an IEEE 802.16 standard), a radio-frequency ID (RFID) protocol, near-field communication (NFC), and/or other wireless communication protocols. Such wireline interfaces may include an Ethernet interface, a Universal Serial Bus (USB) interface, or similar interface to communicate via a wire, a twisted pair of wires, a coaxial cable, an optical link, a fiber-optic link, or other physical connection to a wireline network. The ground station 210 may communicate with the aerial vehicle 230, other ground stations, and/or other entities (e.g., a command center) via the communication system 218.

In an example embodiment, the ground station 210 may include communication systems 218 that allows for both short-range communication and long-range communication. For example, the ground station 210 may be configured for short-range communications using Bluetooth and for long-range communications under a CDMA protocol. In such an embodiment, the ground station 210 may be configured to function as a "hot spot"; or in other words, as a gateway or proxy between a remote support device (e.g., the tether 220, the aerial vehicle 230, and other ground stations) and one or more data networks, such as cellular network and/or the Internet. Configured as such, the ground station 210 may facilitate data communications that the remote support device would otherwise be unable to perform by itself.

For example, the ground station 210 may provide a WiFi connection to the remote device, and serve as a proxy or gateway to a cellular service provider's data network, which the ground station 210 might connect to under an LTE or a 3G protocol, for instance. The ground station 210 could also serve as a proxy or gateway to other ground stations or a command station, which the remote device might not be able to otherwise access.

Moreover, as shown in FIG. 2, the tether 220 may include transmission components 222 and a communication link 224. The transmission components 222 may be configured to transmit electrical energy from the aerial vehicle 230 to the ground station 210 and/or transmit electrical energy from the ground station 210 to the aerial vehicle 230. The transmission components 222 may take various different forms in various different embodiments. For example, the transmission components 222 may include one or more conductors that are configured to transmit electricity. And in at least one such example, the one or more conductors may include aluminum and/or any other material which allows for the conduction of electric current. Moreover, in some implementations, the transmission components 222 may surround a core of the tether 220 (not shown).

The ground station 210 could communicate with the aerial vehicle 230 via the communication link 224. The communication link 224 may be bidirectional and may include one or more wired and/or wireless interfaces. Also, there could be one or more routers, switches, and/or other devices or networks making up at least a part of the communication link 224.

Further, as shown in FIG. 2, the aerial vehicle 230 may include one or more sensors 232, a power system 234, power generation/conversion components 236, a communication system 238, one or more processors 242, data storage 244, and program instructions 246, and a control system 248.

The sensors 232 could include various different sensors in various different embodiments. For example, the sensors 232 may include a global a global positioning system (GPS) receiver. The GPS receiver may be configured to provide data that is typical of well-known GPS systems (which may be referred to as a global navigation satellite system (GNNS)), such as the GPS coordinates of the aerial vehicle 230. Such GPS data may be utilized by the AWT 200 to provide various functions described herein.

As another example, the sensors 232 may include one or more wind sensors, such as one or more pilot tubes. The one or more wind sensors may be configured to detect apparent and/or relative wind. The apparent/relative wind may be wind that is being applied to the aerial vehicle 230, for example. Such wind data may be utilized by the AWT 200 to provide various functions described herein.

Still as another example, the sensors 232 may include an inertial measurement unit (IMU). The IMU may include both an accelerometer and a gyroscope, which may be used together to determine the orientation of the aerial vehicle 230. In particular, the accelerometer can measure the orientation of the aerial vehicle 230 with respect to earth, while the gyroscope measures the rate of rotation around an axis, such as a centerline of the aerial vehicle 230. IMUs are commercially available in low-cost, low-power packages. For instance, the IMU may take the form of or include a miniaturized MicroElectroMechanical System (MEMS) or a NanoElectroMechanical System (NEMS). Other types of IMUs may also be utilized. The IMU may include other sensors, in addition to accelerometers and gyroscopes, which may help to better determine position. Two examples of such sensors are magnetometers and pressure sensors. Other examples of sensors are also possible.

While an accelerometer and gyroscope may be effective at determining the orientation of the aerial vehicle 230, slight errors in measurement may compound over time and result in a more significant error. However, an example aerial vehicle 230 may be able mitigate or reduce such errors by using a magnetometer to measure direction. One example of a magnetometer is a low-power, digital 3-axis magnetometer, which may be used to realize an orientation independent electronic compass for accurate heading information. However, other types of magnetometers may be utilized as well.

The aerial vehicle 230 may also include a pressure sensor or barometer, which can be used to determine the altitude of the aerial vehicle 230. Alternatively, other sensors, such as sonic altimeters or radar altimeters, can be used to provide an indication of altitude, which may help to improve the accuracy of and/or prevent drift of the IMU.

As noted, the aerial vehicle 230 may include the power system 234. The power system 234 could take various different forms in various different embodiments. For example, the power system 234 may include one or more batteries for providing power to the aerial vehicle 230. In some implementations, the one or more batteries may be rechargeable and each battery may be recharged via a wired connection between the battery and a power supply and/or via a wireless charging system, such as an inductive charging system that applies an external time-varying magnetic field to an internal battery and/or charging system that uses energy collected from one or more solar panels.

As another example, the power system 234 may include one or more motors or engines for providing power to the aerial vehicle 230. In some implementations, the one or more motors or engines may be powered by a fuel, such as a hydrocarbon-based fuel. And in such implementations, the fuel could be stored on the aerial vehicle 230 and delivered to the one or more motors or engines via one or more fluid conduits, such as piping. In some implementations, the power system 234 may be implemented in whole or in part on the ground station 210.

As noted, the aerial vehicle 230 may include the power generation/conversion components 236. The power generation/conversion components 326 could take various different forms in various different embodiments. For example, the power generation/conversion components 236 may include one or more generators, such as high-speed, direct-drive generators. With this arrangement, the one or more generators may be driven by one or more rotors, such as the rotors 134A-D. And in at least one such example, the one or more generators may operate at full rated power wind speeds of 11.5 meters per second at a capacity factor which may exceed 60 percent, and the one or more generators may generate electrical power from 40 kilowatts to 600 megawatts.

Moreover, as noted, the aerial vehicle 230 may include a communication system 238. The communication system 238 may take the form of or be similar in form to the communication system 218. The aerial vehicle 230 may communicate with the ground station 210, other aerial vehicles, and/or other entities (e.g., a command center) via the communication system 238.

In some implementations, the aerial vehicle 230 may be configured to function as a "hot spot"; or in other words, as a gateway or proxy between a remote support device (e.g., the ground station 210, the tether 220, other aerial vehicles) and one or more data networks, such as cellular network and/or the Internet. Configured as such, the aerial vehicle 230 may facilitate data communications that the remote support device would otherwise be unable to perform by itself.

For example, the aerial vehicle 230 may provide a WiFi connection to the remote device, and serve as a proxy or gateway to a cellular service provider's data network, which the aerial vehicle 230 might connect to under an LTE or a 3G protocol, for instance. The aerial vehicle 230 could also serve as a proxy or gateway to other aerial vehicles or a command station, which the remote device might not be able to otherwise access.

As noted, the aerial vehicle 230 may include the one or more processors 242, the program instructions 244, and the data storage 246. The one or more processors 242 can be configured to execute computer-readable program instructions 246 that are stored in the data storage 244 and are executable to provide at least part of the functionality described herein. The one or more processors 242 may take the form of or be similar in form to the one or more processors 212, the data storage 244 may take the form of or be similar in form to the data storage 214, and the program instructions 246 may take the form of or be similar in form to the program instructions 216.

Moreover, as noted, the aerial vehicle 230 may include the control system 248. In some implementations, the control system 248 may be configured to perform one or more functions described herein. The control system 248 may be implemented with mechanical systems and/or with hardware, firmware, and/or software. As one example, the control system 248 may take the form of program instructions stored on a non-transitory computer readable medium and a processor that executes the instructions. The control system 248 may be implemented in whole or in part on the aerial vehicle 230 and/or at least one entity remotely located from the aerial vehicle 230, such as the ground station 210. Generally, the manner in which the control system 248 is implemented may vary, depending upon the particular application.

While the aerial vehicle 230 has been described above, it should be understood that the methods and systems described herein could involve any suitable aerial vehicle that is connected to a tether, such as the tether 230 and/or the tether 110.

Figure 3A:
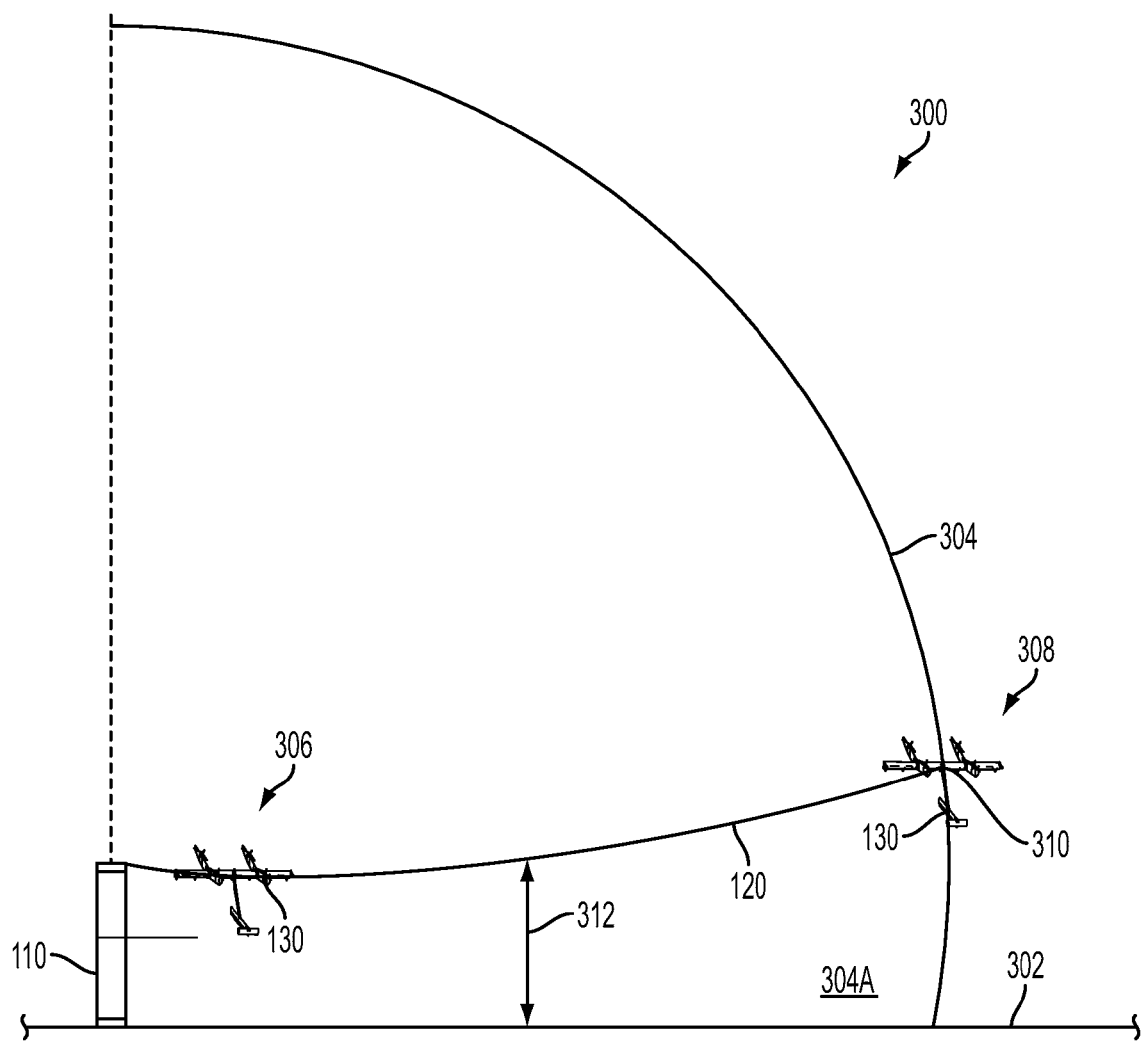
FIGS. 3A and 3B depict an example of an aerial vehicle transitioning from hover flight to crosswind flight, according to an example embodiment.
Figure 3B:
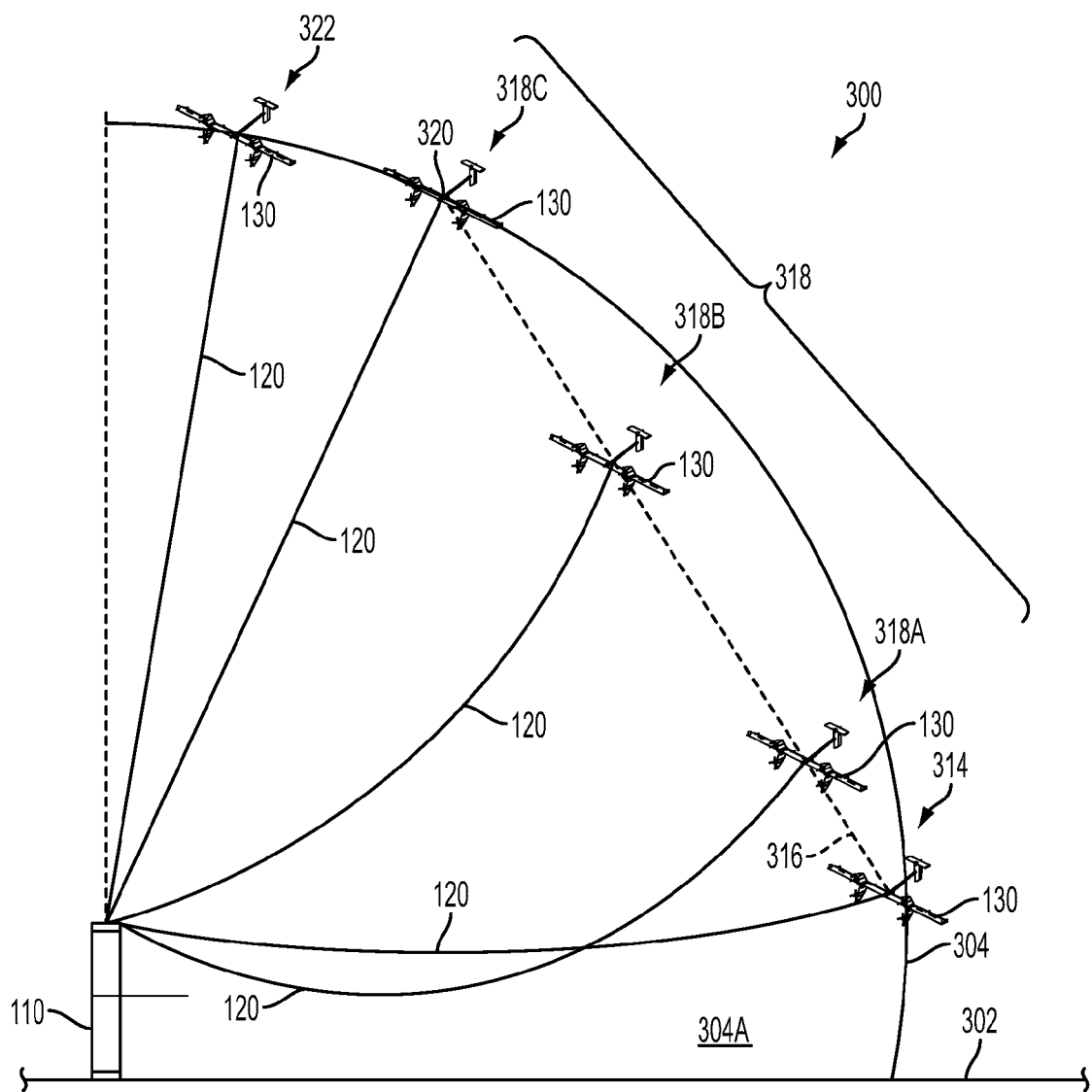

C. Transitioning an Aerial Vehicle from Hover Flight to Crosswind Flight to Generate Power FIGS. 3A and 3B depict an example 300 of transitioning an aerial vehicle from hover flight to crosswind flight in a manner such that power may be generated, according to an example embodiment. Example 300 is generally described by way of example as being carried out by the aerial vehicle 130 described above in connection with FIG. 1. For illustrative purposes, example 300 is described in a series of actions as shown in FIGS. 3A and 3B, though example 300 could be carried out in any number of actions and/or combination of actions.

As shown in FIG. 3A, the aerial vehicle 130 may be connected to the tether 120, and the tether 120 is connected to the ground station 110. The ground station 110 is located on ground 302. Moreover, as shown in FIG. 3A, the tether 120 defines a tether sphere 304 having a radius based on a length of the tether 120, such as a length of the tether 120 when it is extended. Example 300 may be carried out in and/or substantially on a portion 304A of the tether sphere 304. The term "substantially on," as used in this disclosure, refers to exactly on and/or one or more deviations from exactly on that do not significantly impact transitioning an aerial vehicle between certain flight modes as described herein.

Example 300 begins at a point 306 with deploying the aerial vehicle 130 from the ground station 110 in a hover-flight orientation. With this arrangement, the tether 120 may be paid out and/or reeled out. In some implementations, the aerial vehicle 130 may be deployed when wind speeds increase above a threshold speed (e.g., 3.5 m/s) at a threshold altitude (e.g., over 200 meters above the ground 302).

Further, at point 306 the aerial vehicle 130 may be operated in the hover-flight orientation. When the aerial vehicle 130 is in the hover-flight orientation, the aerial vehicle 130 may engage in hover flight. For instance, when the aerial vehicle engages in hover flight, the aerial vehicle 130 may ascend, descend, and/or hover over the ground 302. When the aerial vehicle 130 is in the hover-flight orientation, a span of the main wing 131 of the aerial vehicle 130 may be oriented substantially perpendicular to the ground 302. The term "substantially perpendicular," as used in this disclosure, refers to exactly perpendicular and/or one or more deviations from exactly perpendicular that do not significantly impact transitioning an aerial vehicle between certain flight modes as described herein.

Example 300 continues at a point 308 with while the aerial vehicle 130 is in the hover-flight orientation positioning the aerial vehicle 130 at a first location 310 that is substantially on the tether sphere 304. As shown in FIG. 3A, the first location 310 may be in the air and substantially downwind of the ground station 110.

The term "substantially downwind," as used in this disclosure, refers to exactly downwind and/or one or more deviations from exactly downwind that do not significantly impact transitioning an aerial vehicle between certain flight modes as described herein.

For example, the first location 310 may be at a first angle from an axis extending from the ground station 110 that is substantially parallel to the ground 302. In some implementations, the first angle may be 30 degrees from the axis. In some situations, the first angle may be referred to as azimuth, and the first angle may be between 30 degrees clockwise from the axis and 330 degrees clockwise from the axis, such as 15 degrees clockwise from the axis or 345 degrees clockwise from the axis.

As another example, the first location 310 may be at a second angle from the axis. In some implementations, the second angle may be 10 degrees from the axis. In some situations, the second angle may be referred to as elevation, and the second angle may be between 10 degrees in a direction above the axis and 10 degrees in a direction below the axis. The term "substantially parallel," as used in this disclosure refers to exactly parallel and/or one or more deviations from exactly parallel that do not significantly impact transitioning an aerial vehicle between certain flight modes described herein.

At point 308, the aerial vehicle 130 may accelerate in the hover-flight orientation. For example, at point 308, the aerial vehicle 130 may accelerate up to a few meters per second. In addition, at point 308, the tether 120 may take various different forms in various different embodiments. For example, as shown in FIG. 3A, at point 308 the tether 120 may be extended. With this arrangement, the tether 120 may be in a catenary configuration. Moreover, at point 306 and point 308, a bottom of the tether 120 may be a predetermined altitude 312 above the ground 302. With this arrangement, at point 306 and point 308 the tether 120 may not contact the ground 302.

Example 300 continues at point 314 with transitioning the aerial vehicle 130 from the hover-flight orientation to a forward-flight orientation, such that the aerial vehicle 130 moves from the tether sphere 304. As shown in FIG. 3B, the aerial vehicle 130 may move from the tether sphere 304 to a location toward the ground station 110 (which may be referred to as being inside the tether sphere 304).

When the aerial vehicle 130 is in the forward-flight orientation, the aerial vehicle 130 may engage in forward flight (which may be referred to as airplane-like flight). For instance, when the aerial vehicle 130 engages in forward flight, the aerial vehicle 130 may ascend. The forward-flight orientation of the aerial vehicle 130 could take the form of an orientation of a fixed-wing aircraft (e.g., an airplane) in horizontal flight. In some examples, transitioning the aerial vehicle 130 from the hover-flight orientation to the forward-flight orientation may involve a flight maneuver, such as pitching forward. And in such an example, the flight maneuver may be executed within a time period, such as less than one second.

At point 314, the aerial vehicle 130 may achieve attached flow. Further, at point 314, a tension of the tether 120 may be reduced. With this arrangement, a curvature of the tether 120 at point 314 may be greater than a curvature of the tether 120 at point 308. As one example, at point 314, the tension of the tether 120 may be less than 1 KN, such as 500 newtons (N).

Example 300 continues at one or more points 318 with operating the aerial vehicle 130 in the forward-flight orientation to ascend at an angle of ascent to a second location 320 that is substantially on the tether sphere 304. As shown in FIG. 3B, the aerial vehicle 130 may fly substantially along a path 316 during the ascent at one or more points 318. In this example, one or more points 318 is shown as three points, a point 318A, a point 318B, and a point 318C. However, in other examples, one or more points 318 may include less than three or more than three points.

In some examples, the angle of ascent may be an angle between the path 316 and the ground 302. Further, the path 316 may take various different forms in various different embodiments. For instance, the path 316 may be a line segment, such as a chord of the tether sphere 304.

As shown in FIG. 3B, the second location 320 may be in the air and substantially downwind of the ground station 110. The second location 320 may be oriented with respect to the ground station 110 the similar way as the first location 310 may be oriented with respect to the ground station 110.

For example, the second location 320 may be at a first angle from an axis extending from the ground station 110 that is substantially parallel to the ground 302. In some implementations, the first angle may be 30 degrees from the axis. In some situations, the first angle may be referred to as azimuth, and the angle may be between 30 degrees clockwise from the axis and 330 degrees clockwise from the axis, such as 15 degrees clockwise from the axis or 345 degrees clockwise from the axis.

In addition, as shown in FIG. 3B, the second location 320 may be substantially upwind of the first location 310. The term "substantially upwind," as used in this disclosure, refers to exactly upwind and/or one or more deviations from exactly upwind that do not significantly impact transitioning an aerial vehicle between certain flight modes as described herein.

At one or more points 318, a tension of the tether 120 may increase during the ascent. For example, a tension of the tether 120 at point 318C may be greater than a tension of the tether 120 at point 318B, a tension of the tether 120 at point 318B may be greater than a tension of the tether 120 at point 318A. Further, a tension of the tether 120 at point 318A may be greater than a tension of the tether at point 314.

With this arrangement, a curvature of the tether 120 may decrease during the ascent. For example, a curvature the tether 120 at point 318C may be less than a curvature the tether at point 318B, and a curvature of the tether 120 at point 318B may be less than a curvature of the tether at point 318A. Further, in some examples, a curvature of the tether 120 at point 318A may be less than a curvature of the tether 120 at point 314.

Example 300 continues at a point 322 with transitioning the aerial vehicle 130 from the forward-flight orientation to a crosswind-flight orientation. In some examples, transitioning the aerial vehicle 130 from the forward-flight orientation to the crosswind-flight orientation may involve a flight maneuver. When the aerial vehicle 130 is in the crosswind-flight orientation, the aerial vehicle 130 may engage in crosswind flight. For instance, when the aerial vehicle 130 engages in crosswind flight, the aerial vehicle 130 may fly substantially along a path, such as path 150, to generate electrical energy. In some implementations, a natural roll and/or yaw of the aerial vehicle 130 may occur during crosswind flight.

Figure 3C:
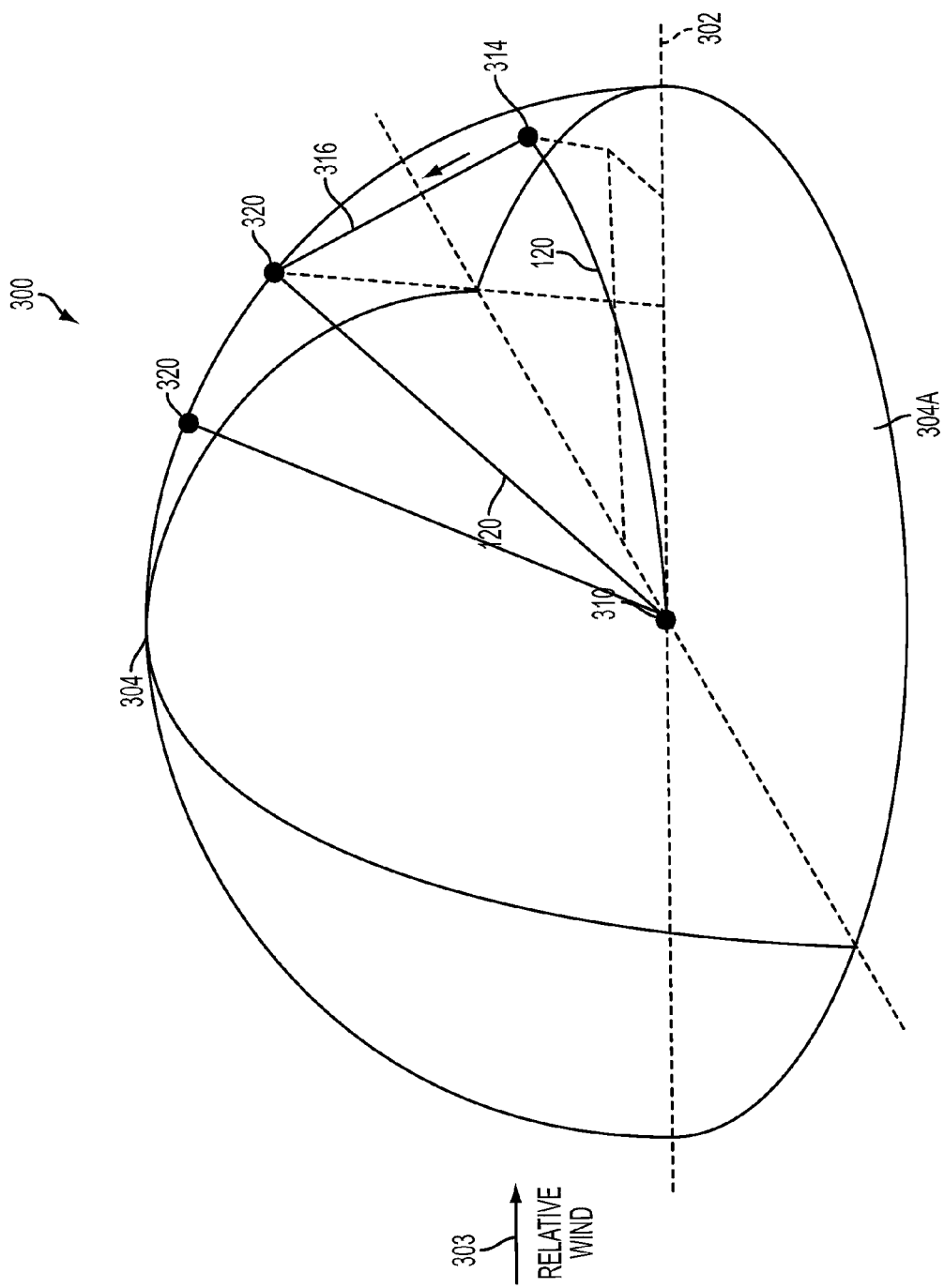
FIG. 3C depicts an example of an aerial vehicle transitioning from hover flight to crosswind flight in a tether sphere, according to an example embodiment.

FIG. 3C depicts example 300 from a three-dimensional (3D) perspective. Accordingly, like numerals may denote like entities. As noted above, tether sphere 304 has a radius based on a length of a tether 120, such as a length of the tether 120 when it is extended. Also as noted above, in FIG. 3C, the tether 120 is connected to ground station 310, and the ground station 310 is located on ground 302. Further, relative wind 303 contacts the tether sphere 304. Note, in FIG. 3C, only a portion of the tether sphere 304 that is above the ground 302 is depicted. The portion may be described as one half of the tether sphere 304.

As shown in FIG. 3C, the first portion 304A of the tether sphere 304 is substantially downwind of the ground station 310. In FIG. 3C, the first portion 304A may be described as one quarter of the tether sphere 304.

Like FIG. 3B, FIG. 3C depicts transitioning aerial vehicle 130 (not shown in FIG. 3C to simply the Figure) between hover flight and crosswind flight. As shown in FIG. 3C, when the aerial vehicle 130 transitions from the hover-flight orientation to a forward-flight orientation, the aerial vehicle may be positioned at a point 314 that is inside the first portion 304A of the tether sphere 304. Further still, as shown in FIG. 3C, when aerial vehicle 130 ascends in the forward-flight orientation to a location 320 that is substantially on the first portion 304A of the tether sphere 304, the aerial vehicle may follow a path 316. Yet even further, as shown in FIG. 3C, aerial vehicle 130 may then transition from location 320 in a forward-flight orientation to a crosswind flight orientation at location 322, for example.

Illustrative embodiments relate to aerial vehicles, which may be used in a wind energy system, such as an Airborne Wind Turbine (AWT). In particular, illustrative embodiments may relate to or take the form of methods and systems for transitioning an aerial vehicle between certain flight modes that facilitate conversion of kinetic energy to electrical power.

D. Power Generation in Crosswind Flight

As explained above, the aerial vehicle 130 may fly substantially along a flight path, while operating in crosswind flight, to generate electrical power. The instantaneous electrical power generated by the aerial vehicle 130 may depend on the location of the aerial vehicle 130 in its flight path. Therefore, the instantaneous power generated by the aerial vehicle 130 may oscillate as the aerial vehicle 130 circulates its flight path. Further, the instantaneous generated power may also be periodic as the aerial vehicle 130 may repeatedly circulate its flight path. Each full circulation of the flight path may correspond to a period, T, of the periodically oscillating generated power. Therefore, the characteristics of the generated power, such as the frequency, may depend on the aerial vehicle 130's flight path.

Figure 4B:
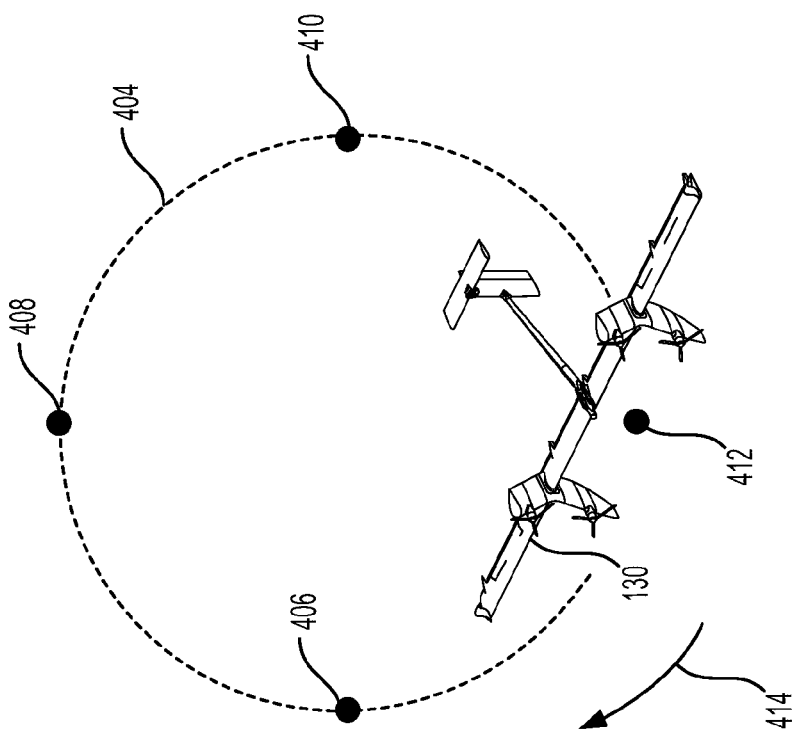
FIGS. 4A and 4B depict an aerial vehicle generating power, according to an example embodiment.
Figure 4A:
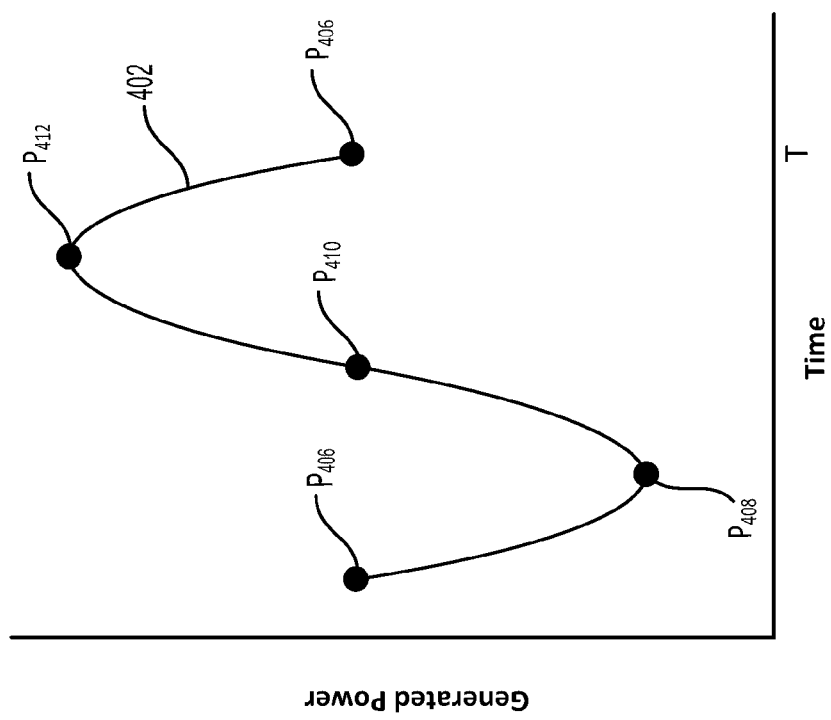

For example, a profile of the power generated by the aerial vehicle 130 as a function of time (also referred to herein as a "power profile") may vary approximately sinusoidally as the aerial vehicle 130 circulates its flight path. FIG. 4A illustrates an aerial vehicle, which may generate a sinusoidally varying power profile, according to an exemplary embodiment. FIG. 4B illustrates a period, T, of a sinusoidally oscillating power profile 402 of the aerial vehicle 130 circling the flight path in a direction 414.

The period T of the power profile 402 corresponds to a full circulation of the flight path 404 by the aerial vehicle 130. For instance, starting at position 406 of the flight path 404, the aerial vehicle 130 flying at that position generates an electrical power output represented by point $P_{406}$ of the power profile 402. As the aerial vehicle 130 flies along the flight path 404 to position 408, the power generated by the aerial vehicle 130 decreases. The minimum generated power, represented by point $P_{408}$ of the power profile 402, may be generated as the aerial vehicle 130 flies at its highest position 408 (i.e. top of its flight path 404). As the aerial vehicle 130 continues to fly along the flight path 404 to reach the position 412 (i.e. the bottom of its flight path 404), the generated power increases. The peak generated power, represented by point $P_{412}$ of the power profile 402, may be generated as the aerial vehicle 130 flies at its lowest position 412.

The example provided in FIG. 4 and the accompanying description herein is for illustrative purposes only and should not be considered limiting. For example, the power profile 402 may not be sinusoidal, but may vary in other approximately periodic fashions. As another example, all points along the power profile 402 may not always reflect generated power, but rather certain segments of the flight path 404 may result in zero or negative power generation, i.e., glide or power consumption, in which power may be supplied to the aerial vehicle in order to maintain its flight path 404. As another example, the points of minimum $P_{408}$ and maximum $P_{412}$ power generation may not correspond to the peak 408 and trough 412 of the flight path 404, but may occur at some intermediate positions along the flight path 404. Further, the flight path 404 may not be circular as illustrated, but may be some other orbital path, including oblong, variable, and/or asymmetric orbital paths.

E. Ground Power Unit

In an implementation of a power generating system, the AWT 100 may be coupled, via the ground station 110, to a ground power unit. The ground power unit may connect the ground station 110 to an electrical distribution and transmission network (e.g., an electrical grid) via grid connections. The grid connections may include electrical components such as conductors (e.g. transmission lines), regulators, converters, inverters, transformers, rectifiers, capacitor banks, switches, and circuit breakers. Furthermore, in such an implementation, the electrical power generated by the aerial vehicle 130 may flow, via the tether 120, from the aerial vehicle 130 to the ground station 110. The generated power may then flow from the ground station 110 to the ground power unit, where it may be transmitted to the electrical grid. The ground power unit may also supply power, either from the electrical grid or from a back-up battery system, to the ground station 110 connected to it.

Within examples, the back-up battery system may be a component of the ground power unit. The back-up battery system may include more than one battery, connected in a parallel and/or series configuration, with similar or different batteries or circuits. Within examples, the battery system may include rechargeable batteries, which may be any one of lithium-ion batteries, lead-acid batteries, flow batteries, nickel-cadmium batteries, or any other type of rechargeable battery.

In some examples, the batteries may be recharged using power received from the electrical grid. In other examples, the batteries may be recharged using power generated by the aerial vehicle 130. Further, the back-up battery system may transmit electrical power to the electrical grid, when the aerial vehicle 130 is not generating enough electrical power, to maintain a constant flow of power to the electrical grid.

The battery system may also provide electrical power to the aerial vehicle 130. For instance, the electrical grid may be down and may be unable to provide the aerial vehicle 130 with electrical power, or it may be more cost-effective to provide the aerial vehicle 130 with power from the battery system than from the electrical grid. In an example, the aerial vehicle 130 may need electrical power to deploy, to land, to maintain its flight path, and/or for an emergency situation. Thus, at least in the situation where the electrical grid is incapable of supplying the aerial vehicle 130 with electrical power (e.g. the electrical grid is down), the back-up battery system may supply the aerial vehicle 130 with the electrical power that it may require to operate.

In some implementations of a power generating system, more than one AWT may be connected to a single ground power unit. Connecting more than one AWT to a single ground power unit may decrease infrastructure costs. Additionally, connecting more than one AWT to a shared ground power unit may further decrease costs by decreasing the number of back-up battery systems that may be included in a power generating system. For instance, the number of back-up battery systems may be reduced since the shared ground power unit may include a shared back-up battery system that may provide power to each of the aerial vehicles connected to the shared ground power unit of the power generating system.

Figure 5:
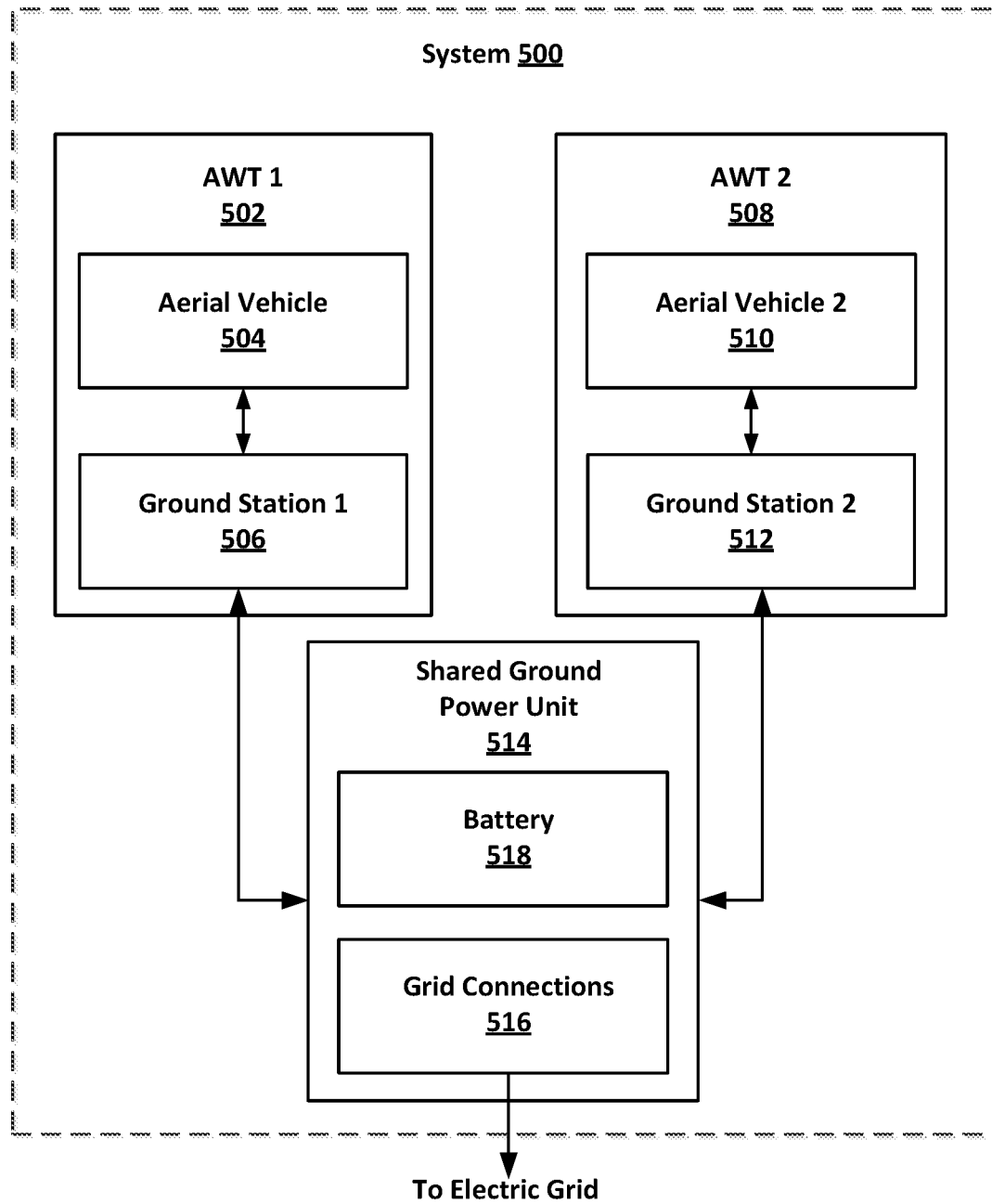
FIG. 5 is a simplified block diagram illustrating a system, according to an exemplary embodiment.

FIG. 5 illustrates a system 500 that includes a plurality of AWTs, according to an exemplary embodiment. Specifically, the system 500 includes two AWTs, AWT 502 and AWT 508, coupled to a shared ground power unit 514. The example provided in FIG. 5 and the accompanying description herein is for illustrative purposes only and should not be considered limiting. For example, the system 500 may include more than two AWTs. As another example, the shared ground power unit 514 may include more than one battery system 518. In yet another example, the battery 518 may be an entity independent from the shared ground power unit 514.

Each AWT in FIG. 5 is coupled to the shared ground power unit 514 via a respective ground station. In this system, each aerial vehicle generates electrical power, which flows via respective tethers (not illustrated) to the ground station 506 and the ground station 512 respectively. Each ground station transmits the power it receives to the shared ground power unit 514. The cumulative electrical power transmitted to the shared ground power unit 514 is substantially the summation of the electrical power generated by each aerial vehicle. Note that some of the electrical power generated by the aerial vehicles may be dissipated due to inefficiencies and losses.

The cumulative electrical power may be transmitted from the ground power unit 514 to the electrical grid via the grid connections 516. The grid connections 516 are typically sized to handle the peak power that may flow through the system 500. Generally, the cost of electrical components increases as the components' power rating increases. As such, connecting AWTs 502 and 508 to the shared ground power unit 514 may increase the peak power flowing through the ground power unit 514, as the cumulative power flowing through the ground power unit 514 is the summation of the powers received from AWTs 502 and 508. As a result, the cost of at least the grid connections 516 in the ground power unit 514 may increase.

More specifically, as explained above, during crosswind flight, the power profile of each aerial vehicle may be a periodically oscillating profile that may vary in phase, frequency, and amplitude depending on environmental and/or operating conditions. Consequently, the cumulative instantaneous power flow into the shared ground power unit 514 may fluctuate due to power of different characteristics (from each of the aerial vehicles) aggregating to form the cumulative power flow. As a result, the cumulative power profile received at the ground power unit 514 may be aperiodic, irregular, and may ripple. Therefore, the electrical grid may receive a fluctuating power input from the shared ground power unit 514.

For example, if the aerial vehicle 504 and the aerial vehicle 508 are flown in a synchronous or near-synchronous pattern, the peak power transmission from each respective ground station may coincide in time, and thus may result in a very large peak power handling requirement of the ground power unit 514. However, in some embodiments, the aerial vehicle 504 and the aerial vehicle 508 may fly in an asynchronous flight pattern such that each aerial vehicle has a determined flight pattern relative to the other aerial vehicle. Accordingly, the asynchronous flight pattern may include a respective flight path for each aerial vehicle. The respective flight path may include the parameters of the flight path (i.e. location, perimeter, width, elevation, etc.) and the location of the each aerial vehicle relative to the other aerial vehicles as each aerial vehicle flies in its respective flight path. Accordingly, at a given time, each aerial vehicle may be a determined location relative to the other aerial vehicle.

Further, the asynchronous flight pattern may be determined such that the power profile of each aerial vehicle is out of phase with respect to the power profile of the other aerial vehicle. As a result, the peak cumulative power flow into the ground power unit 514 may be decreased, and the cumulative power profile may be substantially regular.

Figure 6A:
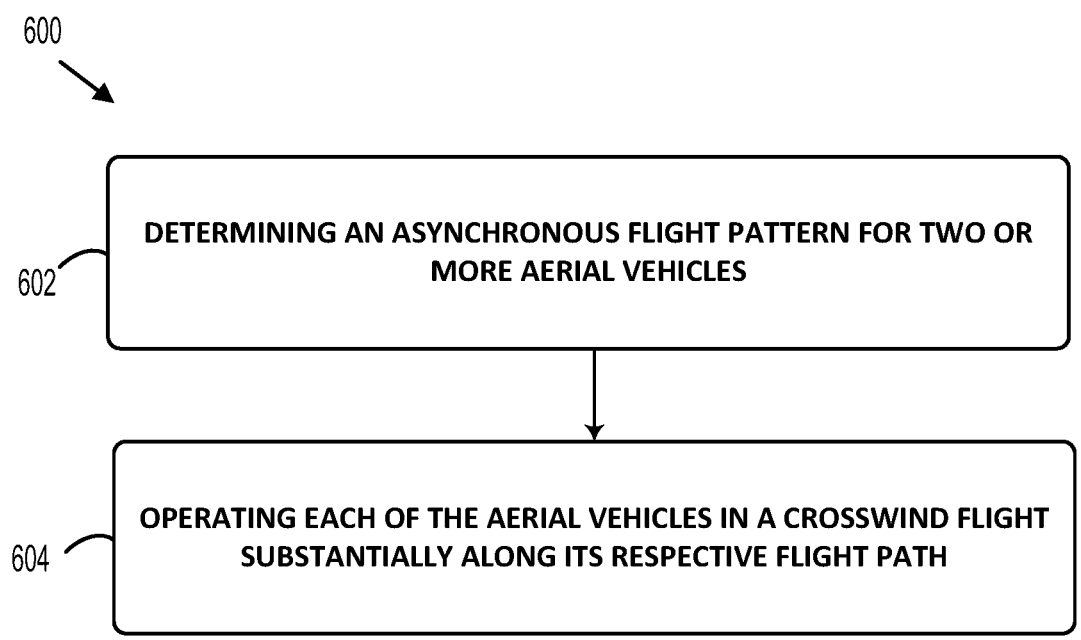
FIGS. 6A and 6B are flowcharts of methods, according to exemplary embodiments.

Accordingly, FIG. 6A is a flowchart of an example process 600 for operating two or more aerial vehicles according to an asynchronous flight pattern. Illustrative methods, such as method 600, may be carried out in whole or in part by a component or components of each AWT, such as by the one or more components of the aerial vehicle 230 shown in FIG. 2 and the ground station 210 shown in FIG. 2. For example, method 600 may be performed by the respective control system 248 of each aerial vehicle. However, it should be understood that example methods, such as method 600, may be carried out by other entities or combinations of entities without departing from the scope of the disclosure.

As shown by block 602, method 600 involves determining an asynchronous flight pattern for two or more aerial vehicles. In an embodiment, the asynchronous flight pattern may include a respective flight path for each of the aerial vehicles. Accordingly, the respective control system of each aerial vehicle may determine the respective flight path for its aerial vehicle. For example, the respective flight path of each aerial vehicle may be determined such that each aerial vehicle has a flight pattern relative to the other aerial vehicles operating according to the asynchronous pattern. In another example, the respective flight path of each aerial vehicle may be determined such that the phase of the power profile of the power generated by each aerial vehicle may be out of phase with respect to the power profile of the power generated by the other aerial vehicles.

In some examples, the asynchronous flight pattern may be determined such that the cumulative power profile is substantially regular and/or the cumulative power output is greater than a certain threshold. For instance, the threshold may be the minimum output of power necessary for the power generating system to be profitable. In other examples, the asynchronous flight pattern determination may be based on the respective location of each aerial vehicle and/or the environmental conditions applicable to each aerial vehicle (i.e. the wind speed of the apparent wind-flow being applied to the respective aerial vehicle). Note that the example considerations for determining the asynchronous flight pattern are for example only and should not be considered limiting. For example, other considerations, such as those disclosed herein with respect to method 610, may be used in method 600.

Accordingly, in response to the asynchronous flight pattern determination, the control system of each aerial vehicle may operate each of the aerial vehicles in crosswind flight substantially along its respective flight path, as shown by block 604. The power profile of each aerial vehicle may be out of phase with respect to each of the power profiles of the other aerial vehicles, as the aerial vehicles fly in the determined asynchronous flight pattern.

Figure 6B:
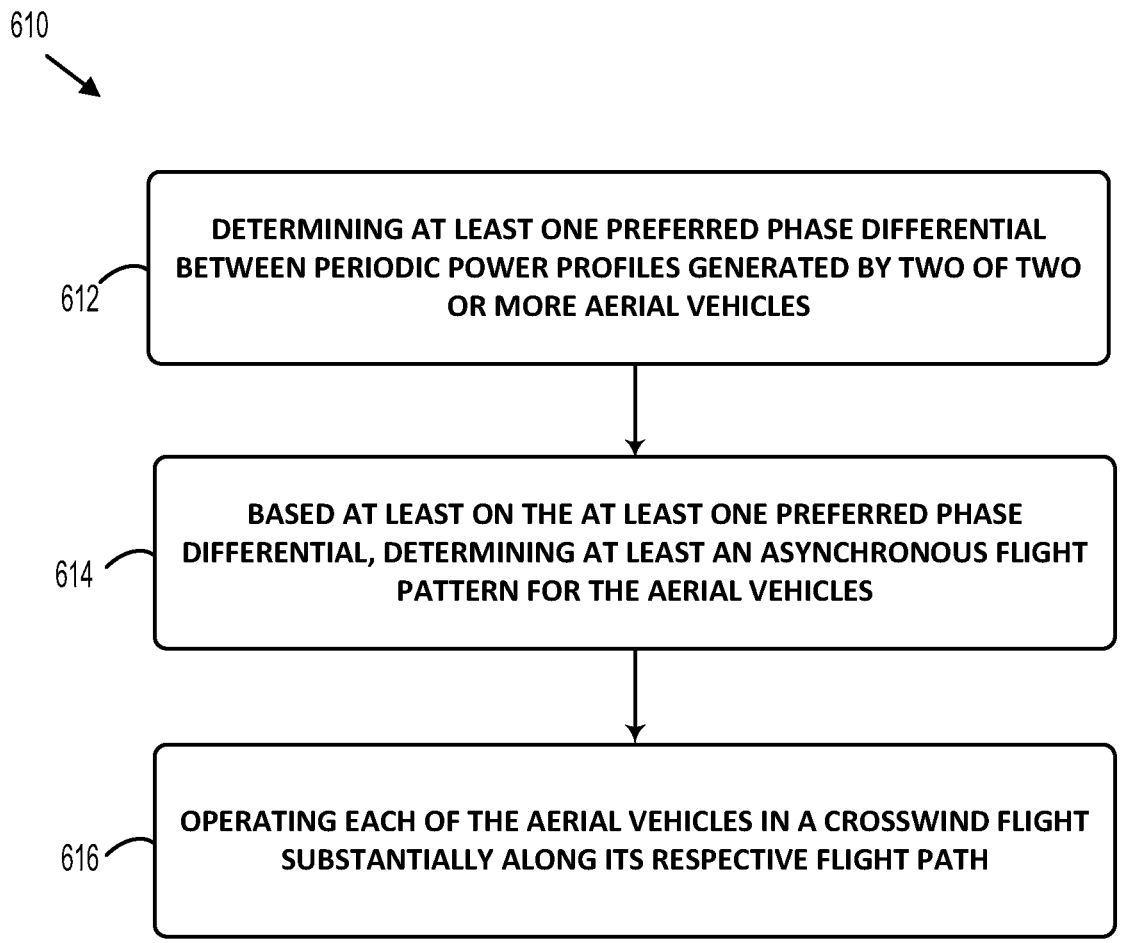

In another example, FIG. 6B is a flowchart of a process 610 for operating two or more aerial vehicles according to an asynchronous flight pattern. In such a process, a respective preferred phase shift between the power profiles of two of two or more aerial vehicles may be determined. The respective preferred phase shift between the power profiles of the two aerial vehicles may accordingly be used to determine an asynchronous flight pattern for the aerial vehicles. More specifically, the respective phase shift between the power profiles of the two aerial vehicles may be used to determine a respective flight path for each of the two aerial vehicles.

As shown by block 612, method 610 involves determining at least one preferred phase differential between the power profiles of two of the aerial vehicles. In some examples, the preferred phase differential may be determined such that the cumulative power profile of the system has specific characteristics. For example, the preferred phase differential may be determined such that the cumulative power profile has a specific frequency, duty cycle, and/or amplitude. Within examples, the preferred phase differential may be the same between the power profiles of any two of the aerial vehicles.

Further, as shown by block 614, method 610 involves determining at least an asynchronous flight pattern for the two or more aerial vehicles based at least on the one preferred phase differential. Accordingly, the control system of each aerial vehicle may determine the respective flight path of its aerial vehicle based on the at least one preferred phase differential. The control system of each aerial vehicle may use information such as the position of the other aerial vehicles, the wind conditions, the determined preferred phase differential, and the power demand from the grid to determine the respective flight path for its aerial vehicle. Further, as the respective flight path of each aerial vehicle is determined such that a preferred phase differential exists between any two of the aerial vehicles, the collective flight paths of the aerial vehicles consolidate to form the asynchronous flight pattern for the aerial vehicles. Note that the example considerations for determining the asynchronous flight pattern are for example only and should not be considered limiting. For example, other considerations, such as those disclosed herein with respect to method 600, may be used in method 610.

Finally, as shown by block 616, method 610 involves operating the aerial vehicles according to the determined asynchronous flight pattern. Accordingly, each of the aerial vehicles may operate, in crosswind flight, according to its respective flight path included in the determined asynchronous flight pattern.

Figure 7A:
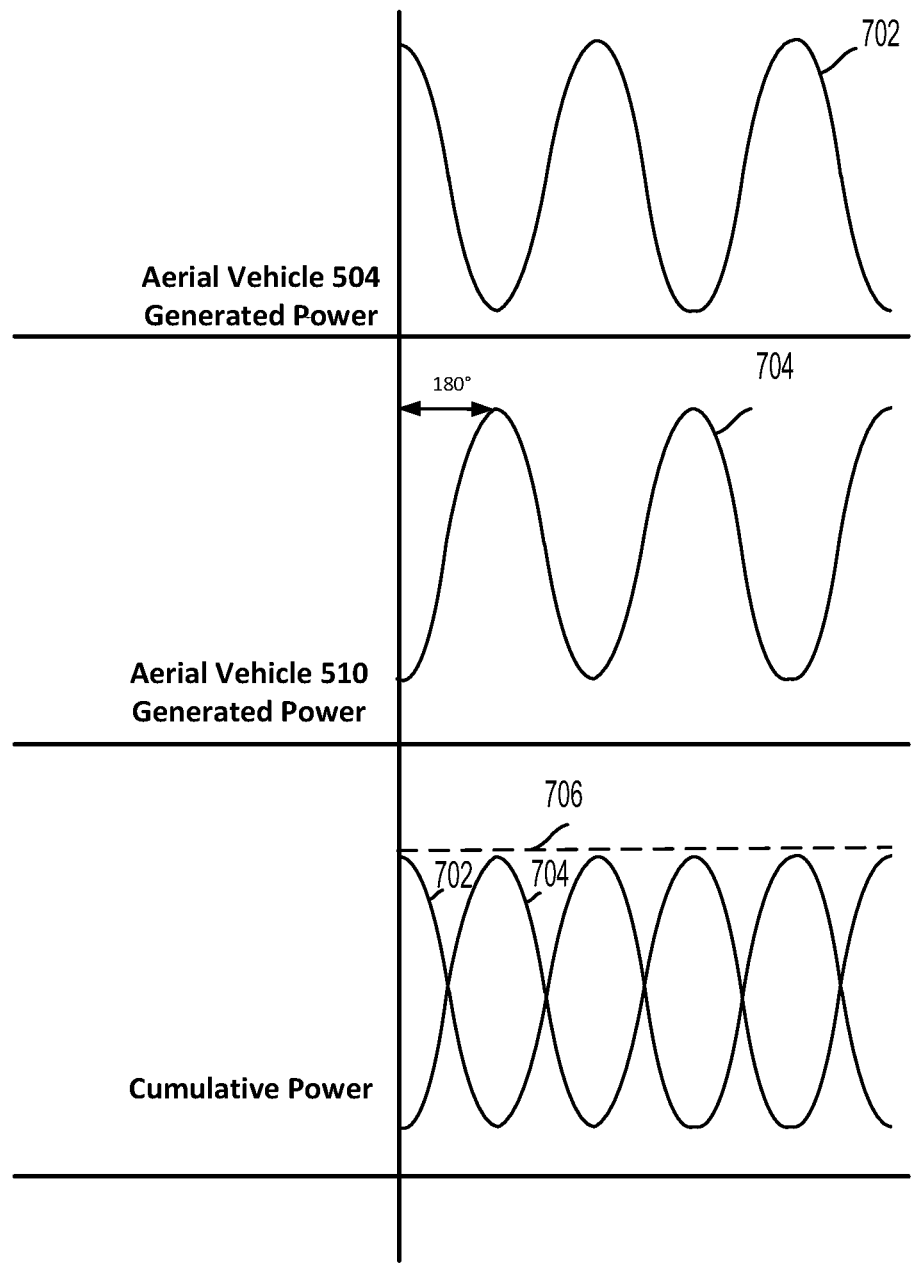
FIGS. 7A and 7B are power profiles of aerial vehicles, according to an exemplary embodiment.

In an exemplary embodiment, FIG. 7A illustrates the power profiles of the two aerial vehicles of the system 500, which may be operating according to a determined asynchronous flight pattern. As illustrated in FIG. 7A, the power profiles of the aerial vehicles are substantially 180 degrees out of phase with relative to one another. Thus, one aerial vehicle may be generating peak power as the other vehicle is generating minimum power. Accordingly, the peak power that may flow through the system may be limited to the peak power generated by one aerial vehicle. As such, the grid components of the ground power unit may be sized to handle at least the peak power of one aerial vehicle. Furthermore, as illustrated in FIG. 7A, the cumulative power profile 706 is substantially regular.

The example provided in FIG. 7A and the accompanying description herein is for illustrative purposes only and should not be considered limiting. For example, the power profile of each aerial vehicle may not be sinusoidal, but may vary in other approximately periodic fashions. As another example, all points along the power profile 702 and 704 may not always reflect generated power, but rather certain segments may result in zero or negative power generation, i.e., glide or power consumption, in which power may be supplied to an aerial vehicle in order to maintain its respective flight path.

As another example, the phase difference between the two profiles may be a phase difference other than 180 degrees. In yet another example, the cumulative power profile 706 may not be uniform as illustrated in FIG. 7A. In some embodiments, the cumulative power may vary, while the cumulative power profile is substantially regular. Accordingly, the peak power that may flow through the system may be greater than the peak power output of one aerial vehicle.

Figure 7B:
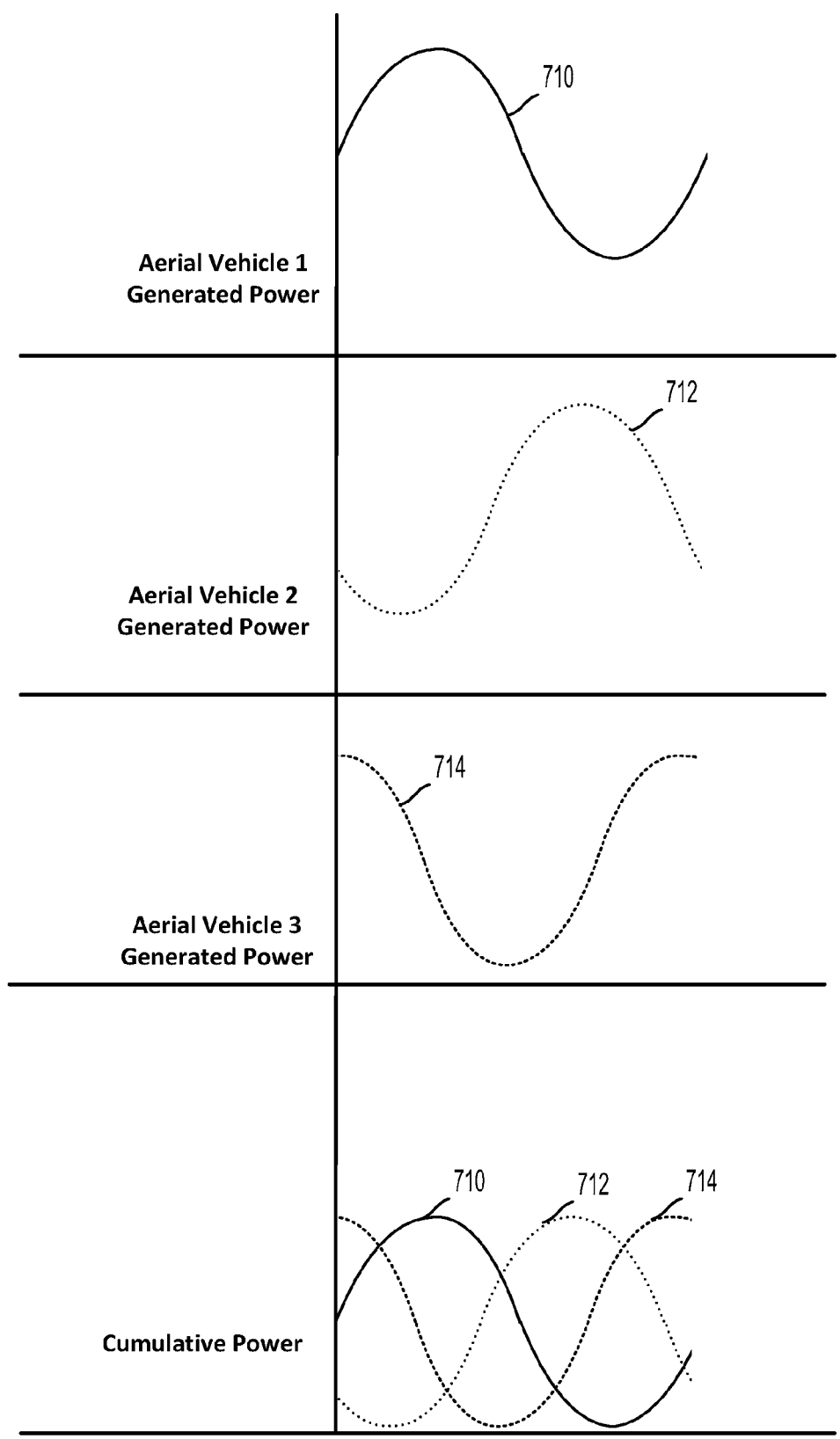

FIG. 7B illustrates the power profiles, 710, 712, and 714, of three aerial vehicles connected to a shared ground power unit, according to an exemplary embodiment. As illustrated in FIG. 7B, the power profile of each aerial vehicle is substantially 120 degrees out of phase with respect to the power profiles of the other two aerial vehicles. Thus, the peak power output of each aerial vehicle is 120 degrees out of phase with respect to the peak power output of the other two aerial vehicles. Accordingly, although the peak power that may flow through the system may be greater than the peak power generated by one aerial vehicle, the peak power is still much less than the possible peak power had the power generated by the each of the aerial vehicles been in phase.

Note that the example provided in FIG. 7B and the accompanying description herein is for illustrative purposes only and should not be considered limiting. For example, the power profile of each aerial vehicle may not be sinusoidal, but may vary in other approximately periodic fashions. As another example, all points along the power profiles may not always reflect generated power, but rather certain segments may result in zero or negative power generation, i.e., glide or power consumption, in which power may be supplied to an aerial vehicle in order to maintain its respective flight path. As another example, the phase difference between the three profiles may be a phase difference other than 120 degrees. In yet another example, more than three AWTs may be connected to a single common shared ground power unit.

Returning to the system 500, the peak power that may flow through the ground power unit 514 may also increase when the aerial vehicle 504 and the aerial vehicle 508 are deployed at the same time. Specifically, an aerial vehicle may require a power, which may be supplied by a ground power unit, to be deployed. Accordingly, launching more than one aerial vehicle simultaneously may magnify the peak power that the electrical components of the ground power unit may handle.

Figure 8:
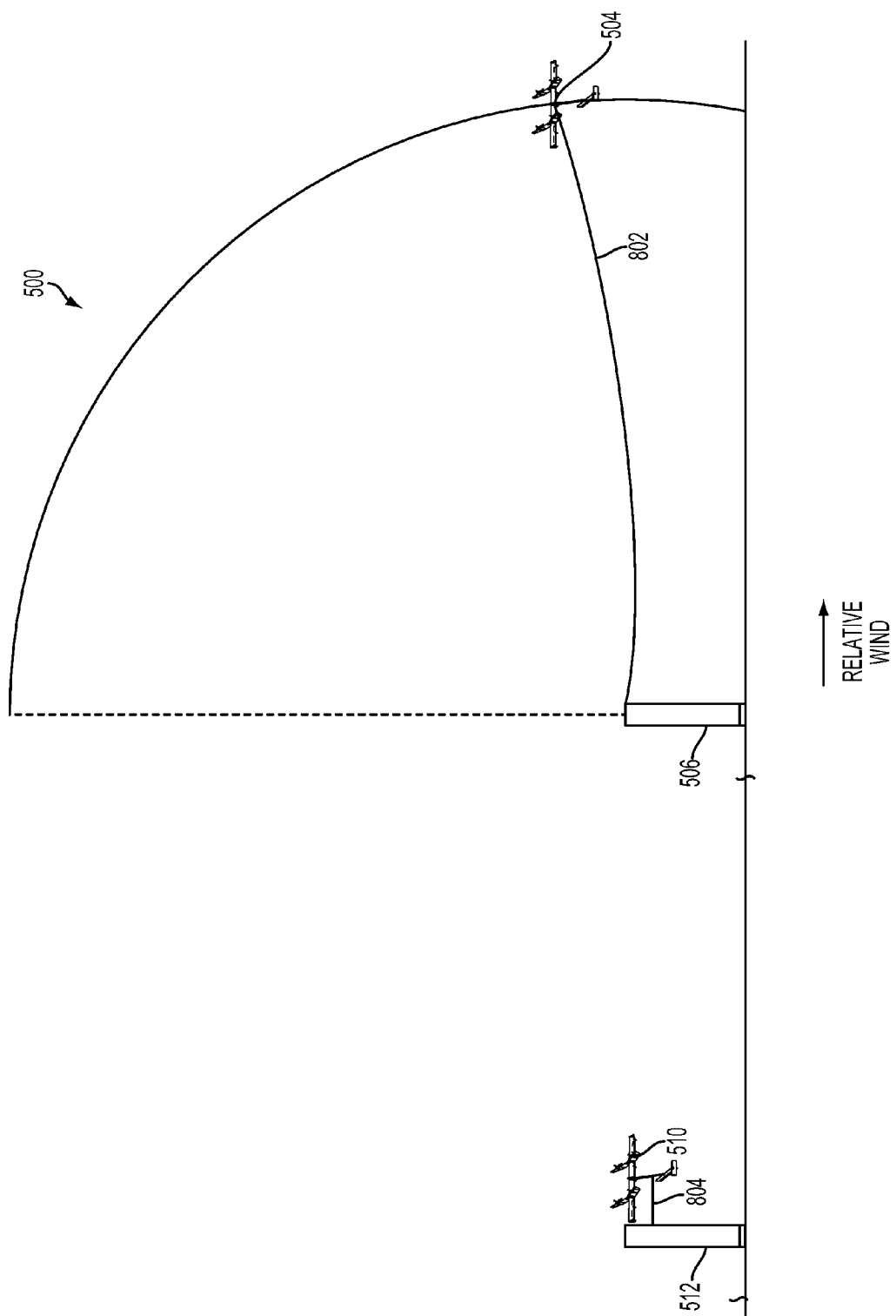

Therefore, in an embodiment, a plurality of aerial vehicles connected to a shared ground power unit may be deployed asynchronously to decrease the peak power that may flow through the system. For example, in system 500, each of the aerial vehicles 504 and 510 may be deployed in a staggered deployment order. As illustrated in FIG. 8, the aerial vehicle 504 may be deployed into hover flight, while the aerial vehicle 510 is still perched to the ground station 512. Furthermore, rather than immediately transitioning from hover flight to crosswind flight, the aerial vehicle 504 may transition to loitering flight.

Like in crosswind flight, an aerial vehicle in loitering flight may be propelled by the wind substantially along a path, which as noted above, may convert kinetic wind energy to electrical energy. In some embodiments, the one or more propellers of the aerial vehicle may generate electrical energy by slowing down the incident wind. However, the flight path determination of an aerial vehicle may be than a crosswind flight path determination.

For example, the loitering flight path determination may be determined such that the aerial vehicle flying in the loitering flight path generates the same or substantially the same amount of power that it needs to operate in loitering flight, which may result in zero or near-zero load on the shared ground power unit. In an embodiment, the power generated by the aerial vehicle as the aerial vehicle flies along its loitering flight path may be used to directly provide the aerial vehicle with the power that it needs to operate in a loitering flight. In another embodiment, the aerial may include a rechargeable battery that stores the power generated by the aerial vehicle as the aerial vehicle operates in a loitering flight. The power stored in the rechargeable battery may subsequently be used to provide power to the aerial vehicle, which the aerial vehicle may require to fly in the loitering flight path.

In another example, the loitering flight path may be the crosswind flight path that an aerial vehicle flying the crosswind flight path generates the least amount of power feasible in crosswind flight. Accordingly, the power that may flow from the aerial vehicle to the shared ground power unit may be decreased. In yet another example, the loitering flight path may be determined such that the aerial vehicle requires the least amount of power from the shared ground power unit when flying along the determined loitering flight path. Accordingly, the power that may flow from the shared ground power unit to the aerial vehicle may be decreased. In other examples, the loitering flight path may be determined such that the power from and/or to the aerial vehicle may be decreased.

In an example, while the aerial vehicle 504 is in loitering flight, the aerial vehicle 510 may deploy and also enter loitering flight. After both aerial vehicles are in loitering flight, the aerial vehicles may transition into crosswind flight to generate electrical power. Thus, by staggering the deployment of the aerial vehicles, the peak power that may flow through the ground power unit 514 may be substantially limited to the peak power required to deploy a single aerial vehicle.

In another example, aerial vehicle 510 may deploy into crosswind flight while aerial vehicle 504 is in loitering flight. Subsequently, aerial vehicle 504 may transition from loitering flight to crosswind flight. The transition from loitering flight to crosswind flight may include at least determining a crosswind flight path for an aerial vehicle. The transition from loitering flight to crosswind flight may also include an asynchronous flight path determination for the aerial vehicles.

Figure 9:
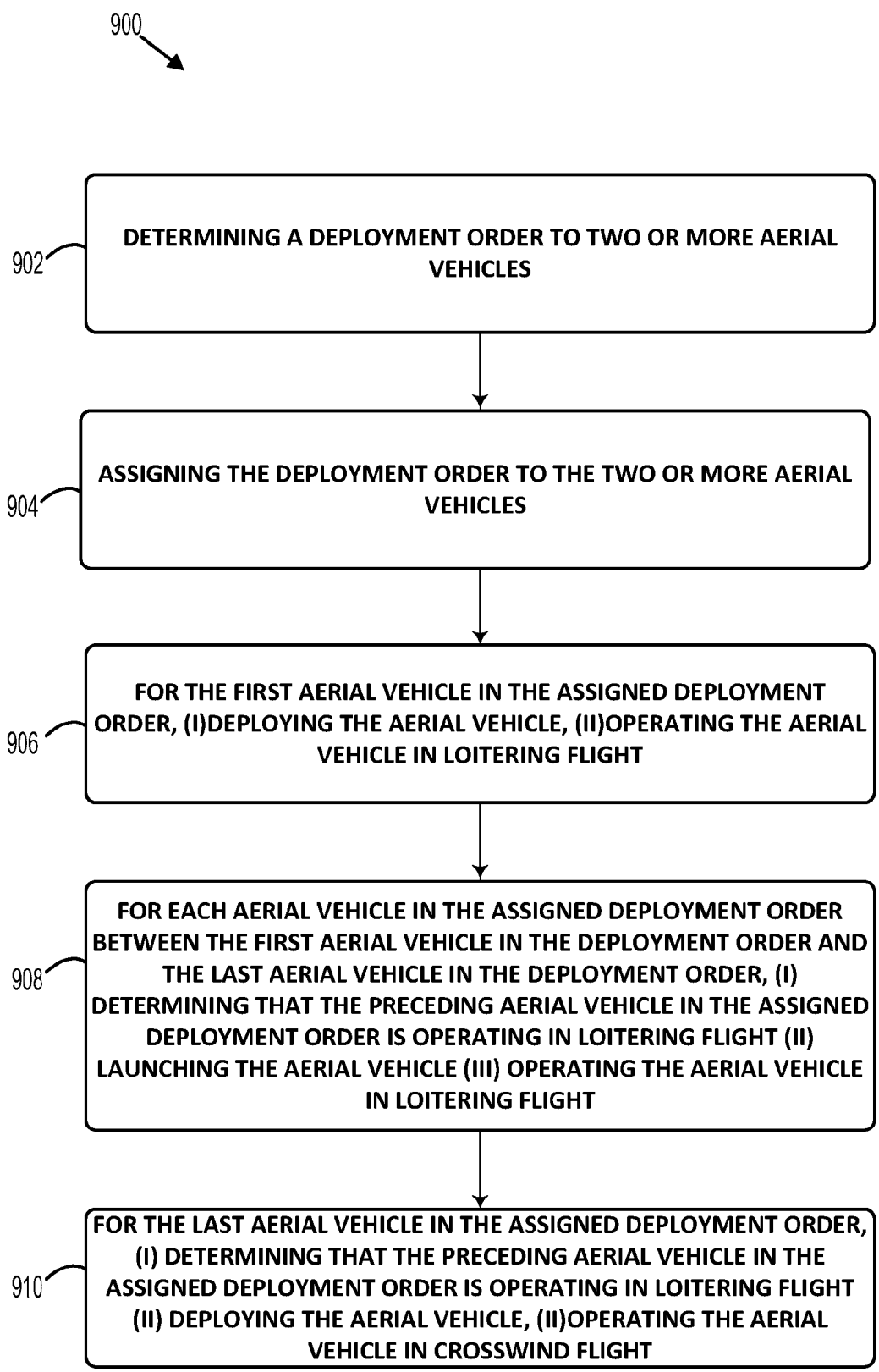
FIG. 9 is a flowchart of a method, according to exemplary embodiment.

FIG. 9 is a flowchart of an example process 900 for deploying two or more aerial vehicles. Illustrative methods, such as method 900, may be carried out in whole or in part by a component or components of at least one of the two or more aerial vehicles, such as by the one or more components of the aerial vehicle 230 shown in FIG. 2 and the ground station 210 shown in FIG. 2. For instance, method 900 may be performed by the control system 248 or by processor 212 shown in FIG. 2. However, it should be understood that example methods, such as method 900, may be carried out by other entities or combinations of entities without departing from the scope of the disclosure.

As shown by block 902, method 900 involves determining a deployment order for two or more aerial vehicles. The ground stations of the aerial vehicles may be connected to a shared ground power unit. The processor 212 of the ground station 210 of each aerial vehicle may communicate with the other ground stations using communication system 218.

Accordingly, at least one processor 212 of the ground stations may determine the deployment order. In some embodiments, the processor 212 may communicate with the other AWTs to determine which AWTs will be activated to generate power to determine which AWTs will be included in the deployment order. In some examples, the deployment order may depend at least the location of each AWT connected to the shared ground power unit or the current and/or projected weather conditions. In other examples, the deployment order may be predetermined and stored in data storage 214 of at least one of the AWTs. In yet other examples, the deployment order may be communicated to at least one AWT from an operator the power generating system. Other considerations may be used to determine the deployment order.

In response to the determination made at block 902, the processor 212 may subsequently assign the deployment order to the aerial vehicles, as shown by block 904. For example, the processor 212 may communicate each aerial vehicle's specific deployment order to each aerial vehicle's respective ground station via communication system 218.

As shown by block 906, the first aerial vehicle in the assigned deployment order may be deployed into hover flight as described in FIG. 3 with respect to example 300. However, rather than transitioning immediately from hover flight to crosswind flight after being deployed, the first deployed aerial vehicle may transition from hover flight into loitering flight. Within examples, the transition from hover flight to loitering flight may be similar to the transition from hover flight to crosswind flight, which is described above.

Further, as shown by block 908, for each aerial vehicle in the assigned deployment order between the first aerial vehicle in the deployment order and the last aerial vehicle in the deployment order, the aerial vehicle determines that the preceding aerial vehicle in the assigned deployment order is operating in loitering flight. Specifically, the ground station of each subsequent aerial vehicle may communicate with the ground station of the aerial vehicle immediately preceding it in order to determine whether its aerial vehicle is operating in loitering flight. If the aerial vehicle immediately preceding it is operating in loitering flight, the aerial vehicle may deploy into hover flight. The aerial vehicle may then transition from hover flight into loitering flight.

Finally, the last aerial vehicle in the assigned deployment order determines whether the aerial vehicle preceding it in the assigned deployment order is operating in loitering flight. If the aerial vehicle immediately preceding it is operating in loitering flight, the aerial vehicle may deploy into hover flight. The aerial vehicle may then transition from hover flight into crosswind flight. Subsequently, the aerial vehicles may transition to crosswind flight to generate electrical power. In another example, all of the aerial vehicles may deploy, according to a staggered deployment order, into loitering flight. Subsequently, the aerial vehicles may transition into crosswind flight.

Accordingly, two or more aerial vehicles coupled to a shared ground power unit may be deployed asynchronously, such that the peak power that may flow through the system during deployment of the aerial vehicles is substantially the peak power required to deploy a single aerial vehicle. The costs of at least the grid components of such a system may be substantially decreased. Other costs may be reduced as the capacity of the back-up batteries in the battery system may be reduced. As the aerial vehicles connected to a shared ground power unit may be deployed asynchronously, the back-up battery may need to provide power only to a single aerial vehicle at a given time, and thus the batteries' capacity may be reduced.

Furthermore, as explained above, two or more aerial vehicles operating in crosswind flight may fly in a determined asynchronous flight pattern. As the two or more aerial vehicles fly in the determined asynchronous flight pattern, variable environmental conditions, such as changing wind speed, may cause one or more of the aerial vehicles to flight out of its determined pattern according to the determined asynchronous flight pattern. The one or more aerial vehicles that may not be flying according to their determined pattern relative to the other aerial vehicles may be referred to as "out-of-sync" aerial vehicles, whereas the aerial vehicles flying according to the determined flight pattern may be referred to as "in-sync" aerial vehicles. Further, the power profile of an out-of-sync aerial vehicle may shift to become in phase with power profile of at least one of the other aerial vehicles. As a result, the power profile of the out-of-sync aerial vehicle may no longer be out of phase with respect to the power generated by the other aerial vehicles that are flying in the determined asynchronous pattern.

Consequently, the peak power that may flow through the system may exceed the rated power of the electrical components, which may result in the failure of at least some of the electrical components in the system. Also, the cumulative power profile may fluctuate, and thus may not meet the demands of the electric grid.

Figure 10:
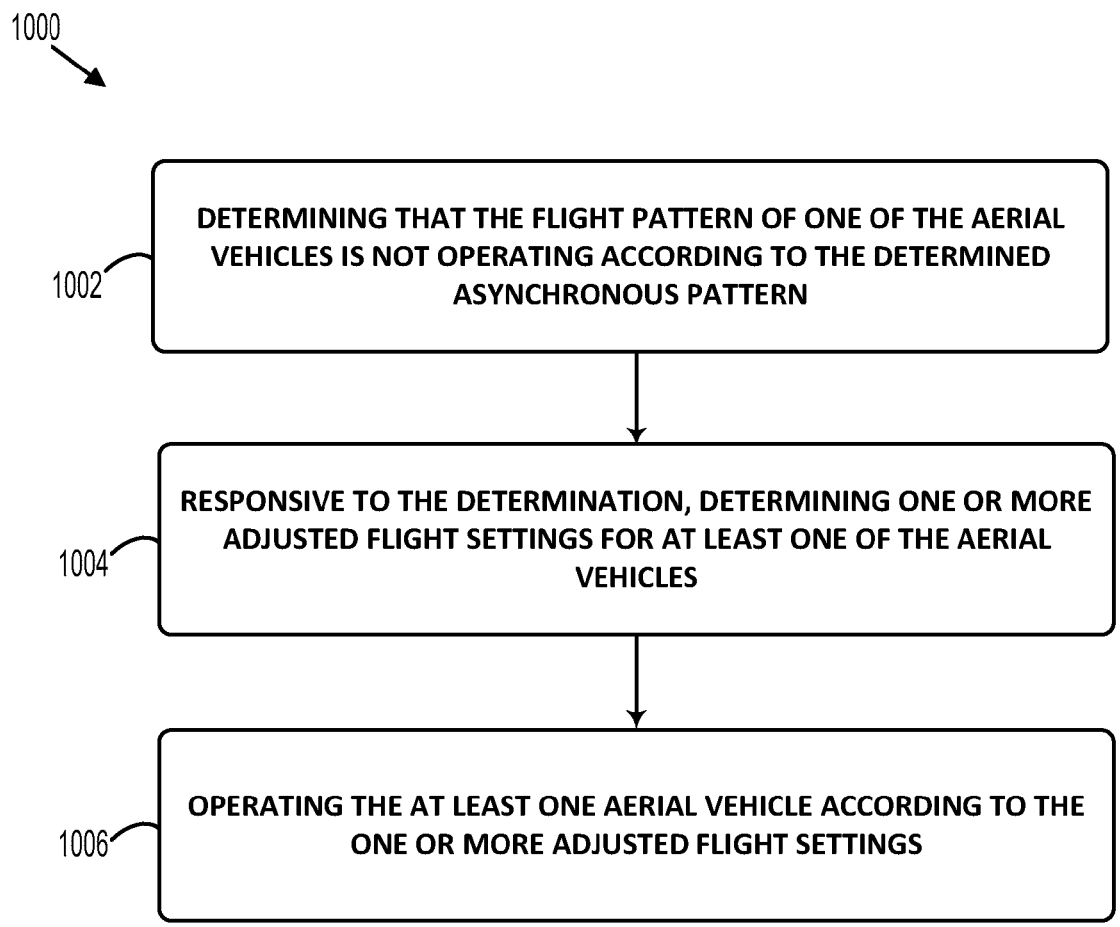
FIG. 10 is a flowchart of a method, according to an example embodiment.

Accordingly, at least the one or more out-of-sync aerial vehicles may adjust one or more of their flight settings to resynchronize with the in-sync aerial vehicles. FIG. 10 illustrates a method 1000 of resyncing the one or more out-of-sync aerial vehicles with the in-sync aerial vehicles, according to an exemplary embodiment. Illustrative methods, such as method 1000, may be carried out in whole or in part by a component or components of at least one of the two or more aerial vehicles, such as by the one or more components of the aerial vehicle 230 shown in FIG. 2 and the ground station 210 shown in FIG. 2. For instance, method 1000 may be performed by the control system 248 shown in FIG. 2. However, it should be understood that example methods, such as method 1000, may be carried out by other entities or combinations of entities without departing from the scope of the disclosure. Furthermore, the control system may periodically perform the method 1000. For example, the control system may periodically perform the method 1000 every second. Other periodicities may be possible.

As shown by block 1002, the method 1000 includes determining that one or more of the aerial vehicles are out-of-sync with the other aerial vehicles. In some embodiments, the control system of each aerial vehicle may monitor the respective position and flight path of the other aerial vehicles connected to the shared ground power unit in order to determine whether one or more of the aerial vehicles are out-of-sync. The control system of each aerial vehicle may receive the position and/or operating conditions of the other aerial vehicles from its ground station. Note that the avionics of each aerial vehicle may be located on the aerial vehicle itself, and thus each respective control system may independently control its respective aerial vehicle.

Accordingly, the control system of the out-of-sync aerial vehicle may determine that its aerial vehicle is flying out-of-sync when the flight pattern of one of the aerial vehicle may not be operating according to the determined asynchronous pattern. In other embodiments, the control system may detect a significant change to its flight pattern due to environmental conditions, which may indicate that the aerial vehicle may be out-of-sync. In yet other embodiments, the control system of an aerial vehicle may continuously and/or periodically monitor the phase differential between the power profile of the aerial vehicle and the power profiles of the other aerial vehicles. If the phase differential is outside a determined margin of error from a preferred phase differential, the control system of the aerial vehicle may determine that the aerial vehicle is out-of-sync. Other criteria may be used to determine that an aerial vehicle is out-of-sync.

In response to the control system of an aerial vehicle determining that its aerial vehicle is out-of-sync, the control system may determine one or more flight settings adjustments for the aerial vehicle. In some embodiments, the control system may use the position and/or operating conditions of the other aerial vehicles to determine the flight setting adjustments to be made to the out-of-sync aerial vehicle.

Within examples, the control system of the out-of-sync aerial vehicle may adjust at least the aerial vehicle's flight path in order to adjust the characteristics of the power profile of the aerial vehicle. For example, the control system may adjust the aerial vehicle's flight path by adjusting the perimeter of the flight path. More specifically, adjusting the aerial vehicle's perimeter may adjust at least the frequency of the power profile of the aerial vehicle. For example, the frequency of power profile generated by an out-of-sync aerial vehicle may be adjusted to match the frequency of the power profiles of one or more of the other aerial vehicles.

In another embodiment, an aerial vehicle may have a determined high wind flight path and a determined low wind flight path, which may respectively correspond to the largest perimeter flight path and the smallest perimeter flight path for the aerial vehicle. The control system of the aerial vehicle may determine an adjusted flight path for the out-of-sync aerial vehicle such that the flight path is a "blend" of the high wind flight path and the low wind flight path. The "blended" flight path may be determined such that the aerial vehicle's power profile has the same frequency as the power profiles of the other aerial vehicles.

However, in some embodiments, although the out-of-sync the power profile of the aerial vehicle has the same frequency as the other aerial vehicles, the phase of the power profile relative to at least one of the other power profiles may not be a preferred phase of the system. Consequently, the control system may adjust one or more other settings of the aerial vehicle to adjust the phase of the power profile of the aerial vehicle relative to another aerial vehicle. Within examples, the control system of the aerial vehicle may make an adjustment to the velocity of the aerial vehicle in order to shift the phase of the power profile of the aerial vehicle. Within examples, any one of the aerial vehicle's drag, lift, or position of its flight path may be adjusted to make an adjustment to the velocity of the aerial vehicle. Adjustments to the other flight settings to make an adjustment to the velocity of an aerial vehicle may be possible.

In an example, the control system of the aerial vehicle may shift the phase of an aerial vehicle's power profile by adjusting the drag opposing the aerial vehicle, which may make an adjustment to the velocity of the aerial vehicle. For instance, the drag on the aerial vehicle may be adjusted by changing the RPM of the aerial vehicle's motors. Decreasing the RPM of the aerial vehicle's motors may increase the drag on the aerial vehicle. Consequently, the velocity of the aerial vehicle may decrease, which may shift the phase of the power profile backwards. Conversely, increasing the RPM of the aerial vehicle's motors may decrease the drag on the aerial vehicle, which may increase the velocity of the aerial vehicle. Increasing the velocity of the aerial vehicle may shift the phase of the power profile forward. In other examples, the drag may be adjusted by adjusting the control surfaces of the aerial vehicle as explained elsewhere herein.

In another example, the control system may adjust the phase of the power generated by the aerial vehicle by adjusting at least the position of the flight path of the aerial vehicle. For example, the control system may move the center of the flight path off of downwind. In some examples, determining the center of the flight path may include determining a wind speed of apparent wind-flow being applied to the aerial vehicle. Based on the wind speed of the apparent wind-flow being applied to the aerial vehicle the center of the flight path may be determined. More specifically, for example, the control system may determine the relative wind speed of the apparent wind-flow being applied to the aerial vehicle.

Based on the determination, the control system may determine a variation angle and using the variation angle may vary the adjusted flight path in a manner such that the adjust flight path is varied from the original flight path at the variation angle. Thus, the adjusted flight path may be varied from being substantially downwind of the ground station. The velocity of the aerial vehicle in the adjusted flight path location may be different than the velocity of the aerial vehicle in the original flight path location. Note that the settings may be changed for a specified period of time. For example, the velocity of the aerial vehicle may be adjusted momentarily to shift the phase of the power profile of the aerial vehicle.

Alternatively, rather than adjusting the flight settings of only the out-of-sync aerial vehicles, the control system of each of the aerial vehicles connected to the shared ground power unit may adjust one or more of their flight settings such that the aerial vehicles fly in-sync in an adjusted asynchronous pattern. Thus, the power profiles of the aerial vehicles flying in the adjusted asynchronous pattern may be out of phase with respect to each other. Further, each aerial vehicle may predict, based on the environmental conditions for instance, how the other aerial vehicles may adjust their flight settings. Each aerial vehicle may use the prediction to determine any adjustments that might be made to its flight settings. In other examples, the control system of at least one of the aerial vehicles (may be an aerial vehicle in-sync), may adjust one or more of its flight settings such that the aerial vehicles may fly according to a determined asynchronous pattern.

Figure 11A:
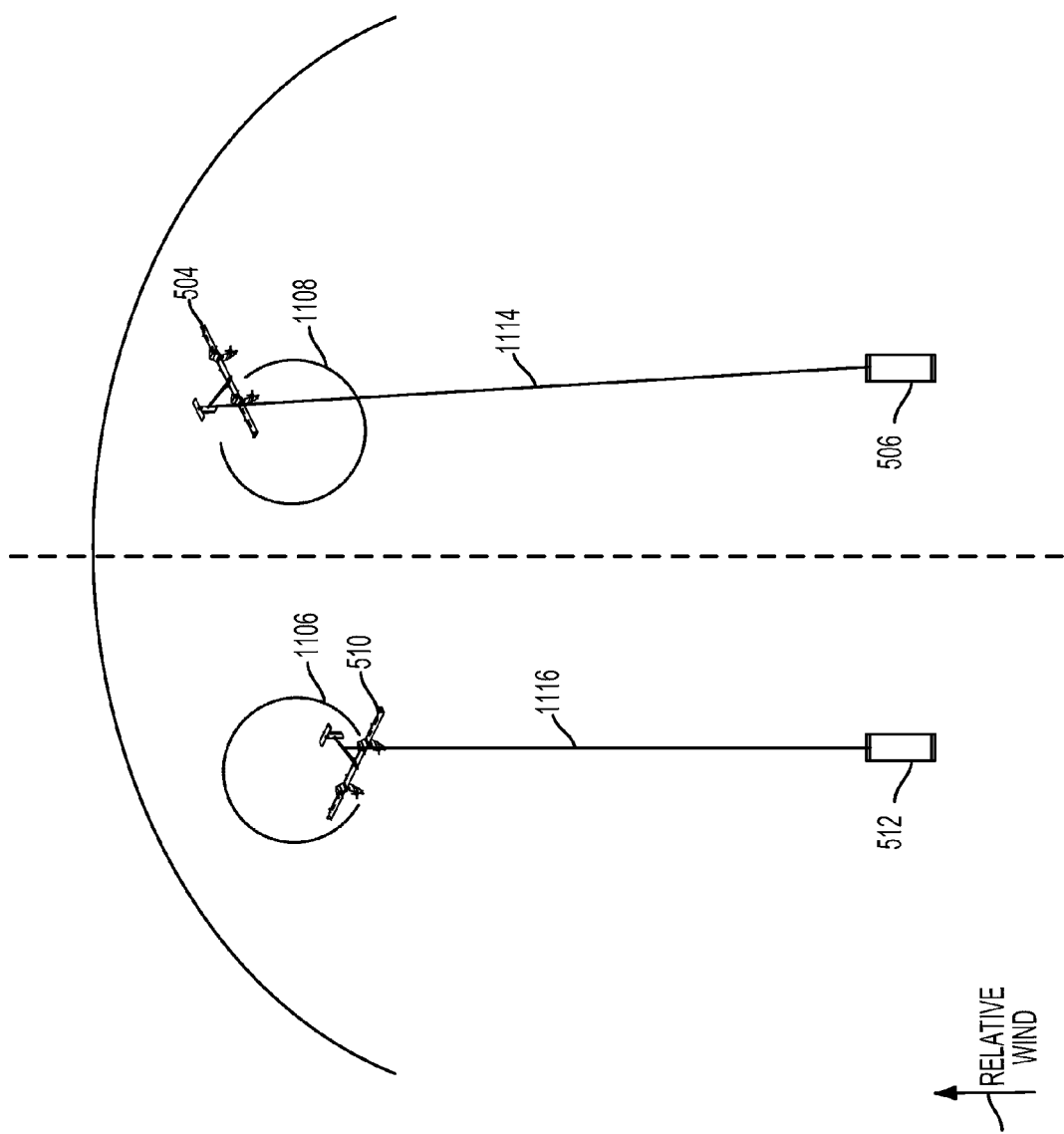
FIGS. 11A and 11B depict aerial vehicles operating according to determined flight settings, according to an example embodiment.
Figure 11B:
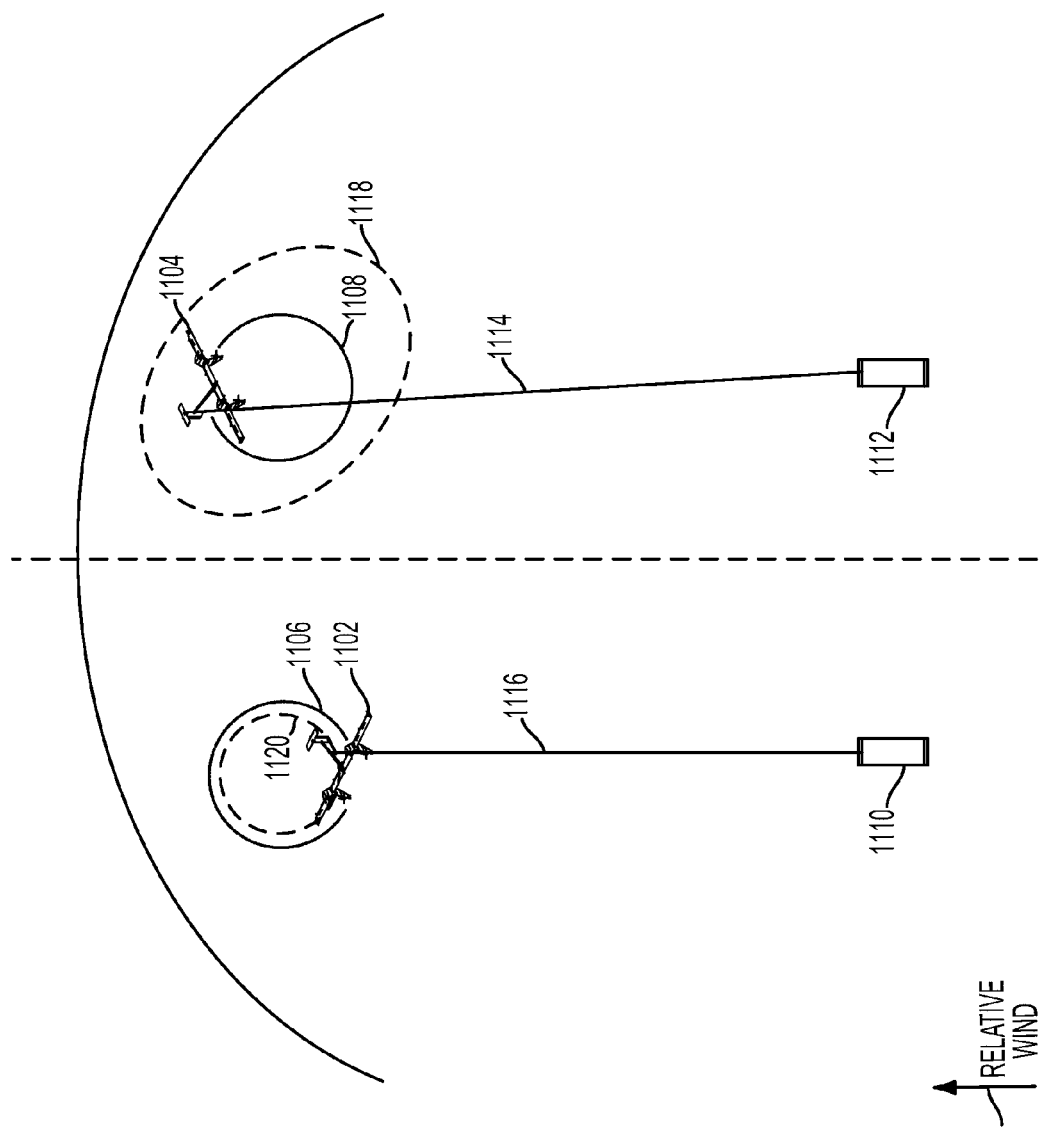

In an example, as shown in FIGS. 11A and 11B, two aerial vehicles (aerial vehicle 510 and aerial vehicle 504 of system 500) may be operating in crosswind flight respectively along flight paths 1106 and 1108. FIG. 11A illustrates an isometric view of aerial vehicles 504 and 510 operating in crosswind flight orientation respectively along flight paths 1106 and 1108 from a perspective that is above and behind ground stations 506 and 512.

As illustrated in FIG. 11A, the aerial vehicles are operating according to a determined asynchronous flight pattern. More specifically, the aerial vehicle 504 may be generating substantially peak power while flying at the bottom of its flight path 1106. Simultaneously, the aerial vehicle 510 may be generating minimum power while flying at the top of its flight path 1108. However, as explained above, at least one of the aerial vehicles 504 and 510 may experience changing environmental conditions that may cause one of the aerial vehicles to fly out-of-sync with the other aerial vehicle.

In this example, changing wind conditions cause the aerial vehicle 504 to fly out-of-sync with the aerial vehicle 510 (i.e. the aerial vehicle 504 is not flying according to the determined asynchronous pattern). Accordingly, the control system of the aerial vehicle 504 may detect that the aerial vehicle 504 is out-of-sync. Likewise, the control system of the aerial vehicle 510, which is receiving aerial vehicle 504's positioning information, may detect that the aerial vehicle 504 is flying out-of-sync. As a result of aerial vehicle 504 flying out-of-sync, the phase of the power profile of the aerial 504 is shifted forward relative to the power profile of the aerial vehicle 510, which may cause the power profiles of the aerial vehicles to be in-phase.

In response to detecting that the aerial vehicle 504 is out-of-sync, the control system of each aerial vehicle may adjust one or more flight settings such that the aerial vehicles 504 and 510 fly in-sync. In some examples, at least one of the aerial vehicles may adjust one or more flight settings such that the aerial vehicles fly according to the original determined asynchronous flight pattern. In other examples, at least one of the aerial vehicles may adjust one or more flight settings such that the aerial vehicles fly according to an updated asynchronous flight pattern. For instance, an updated asynchronous flight pattern may be determined based on a preferred phase differential between the power profiles of each of the aerial vehicles.

In the example of FIG. 11, both aerial vehicle 504 and 510 may adjust one or more of flight settings such that the phase between the power profiles of each aerial vehicle is substantially the preferred phase. More specifically, the control system of the aerial vehicle 504 may adjust at least the perimeter of the aerial vehicle 504's flight path 1108 to adjust the frequency of the power profile of the aerial vehicle. As illustrated in FIG. 11B, the control system of the aerial vehicle may increase the perimeter of the flight path 1108 such that the adjusted flight path 1118 is wider, which may adjust the frequency of the power profile as explained above. Subsequently, the control system may momentarily adjust the velocity of the aerial vehicle, using methods described herein, to shift the phase of the power profile back.

Furthermore, the control system of the aerial vehicle 510 may also decrease the perimeter of the flight path 1106 such that the adjusted flight path 1120 is narrower. As explained above, decreasing the perimeter of the flight path 1106 may adjust the frequency of the power profile of the aerial vehicle 1102. Subsequently, the control system may momentarily adjust the velocity of the aerial vehicle 1102, using methods described herein, to shift the phase of the power profile forward. Accordingly, the aerial vehicles may be flying in-sync such that the phase between the power profiles of the aerial vehicles is the determined preferred phase differential.

The example provided in FIG. 11 and the accompanying description herein is for illustrative purposes only and should not be considered limiting. For example, more than two aerial vehicles may be included in system 500. As another example, the aerial vehicle may have flight paths different than the flight paths illustrated in FIG. 11.

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims.

The above detailed description describes various features and functions of the disclosed systems, devices, and methods with reference to the accompanying figures. In the figures, similar symbols typically identify similar components, unless context dictates otherwise. The example embodiments described herein and in the figures are not meant to be limiting. Other embodiments can be utilized, and other changes can be made, without departing from the spirit or scope of the subject matter presented herein. It will be readily understood that the aspects of the present disclosure, as generally described herein, and illustrated in the figures, can be arranged, substituted, combined, separated, and designed in a wide variety of different configurations, all of which are explicitly contemplated herein.

A block that represents a processing of information may correspond to circuitry that can be configured to perform the specific logical functions of a herein-described method or technique. Alternatively or additionally, a block that represents a processing of information may correspond to a module, a segment, or a portion of program code (including related data). The program code may include one or more instructions executable by a processor for implementing specific logical functions or actions in the method or technique. The program code and/or related data may be stored on any type of computer readable medium such as a storage device including a disk or hard drive or other storage medium.

The computer readable medium may also include non-transitory computer readable media such as computer-readable media that stores data for short periods of time like register memory, processor cache, and random access memory (RAM). The computer readable media may also include non-transitory computer readable media that stores program code and/or data for longer periods of time, such as secondary or persistent long term storage, like read only memory (ROM), optical or magnetic disks, compact-disc read only memory (CD-ROM), for example. The computer readable media may also be any other volatile or non-volatile storage systems. A computer readable medium may be considered a computer readable storage medium, for example, or a tangible storage device.

Moreover, a block that represents one or more information transmissions may correspond to information transmissions between software and/or hardware modules in the same physical device. However, other information transmissions may be between software modules and/or hardware modules in different physical devices.

The particular arrangements shown in the figures should not be viewed as limiting. It should be understood that other embodiments can include more or less of each element shown in a given figure. Further, some of the illustrated elements can be combined or omitted. Yet further, an example embodiment can include elements that are not illustrated in the figures.

While various aspects and embodiments have been disclosed herein, other aspects and embodiments will be apparent to those skilled in the art. The various aspects and embodiments disclosed herein are for purposes of illustration and are not intended to be limiting, with the true scope being indicated by the following claims.

The invention claimed is:

1. A computer implemented method comprising:
   determining an asynchronous flight pattern for two or more aerial vehicles,
   wherein the asynchronous flight pattern comprises a respective flight path for each of the two or more aerial vehicles, wherein each of the aerial vehicles is coupled to a respective separate ground station through a respective tether, and wherein each ground station is coupled to a common ground power unit; and
   operating each of the aerial vehicles in a crosswind flight substantially along its respective flight path, wherein each aerial vehicle generates electrical power over time in a periodic profile, and wherein the power profile of each aerial vehicle is out of phase with respect to the power profile generated by each of the other aerial vehicles.

2. The computer implemented method of claim 1 further comprising:
   while the aerial vehicles are operating in the crosswind flight:
      determining that the flight pattern of one of the aerial vehicles is not operating according to the determined asynchronous pattern relative to at least one other aerial vehicle;
      responsive to the determination, determining one or more adjusted flight settings for at least one of the aerial vehicles; and
      operating the at least one aerial vehicle according to the one or more adjusted flight settings.

3. The computer implemented method of claim 2, wherein the adjusted flight settings change the phase of the periodic power profile generated by the at least one aerial vehicle relative to the periodic profile generated by at least one other aerial vehicle.

4. The computer implemented method of claim 2, wherein the adjusted flight settings change the frequency of the periodic power profile generated by the at least one aerial vehicle.

5. The computer implemented method of claim 2, wherein the one or more adjusted flight settings comprise a different flight path of the at least one aerial vehicle.

6. The computer implemented method of claim 2, wherein the one or more adjusted flight settings comprise adjustments to the velocity of the at least one aerial vehicle.

7. A computer implemented method comprising:
   determining at least one preferred phase differential between periodic power profiles generated by two of two or more aerial vehicles, wherein each of the aerial vehicles is coupled to a respective separate ground station through a respective tether, and wherein each ground station is coupled to a common ground power unit;
   based at least on the at least one preferred phase differential, determining an asynchronous flight pattern for the aerial vehicles, wherein the determined asynchronous flight pattern comprises a respective flight path for each of the aerial vehicles; and
   operating each of the aerial vehicles in a crosswind flight substantially along its respective flight path, wherein each aerial vehicle generates electrical power over time in a periodic profile, and wherein a phase differential between the power profiles generated by two of the aerial vehicles is substantially the preferred phase differential.

8. The computer implemented method of claim 7 further comprising:
   while the aerial vehicles are operating in the crosswind flight:
      determining that the flight pattern of one of the aerial vehicles is not operating according to the determined asynchronous flight pattern relative to at least one other aerial vehicle;
      responsive to the determination, determining at least one adjusted preferred phase differential;
      based on the at least one adjusted preferred phase differential, determining one or more adjusted flight settings for at least one of the two or more aerial vehicles; and
      operating the at least one aerial vehicle according to the one or more adjusted flight settings.

9. The computer implemented method of claim 8, wherein the adjusted flight settings change the phase of the periodic power profile generated by the at least one aerial vehicle relative to the periodic profile generated by at least one other aerial vehicle.

10. The computer implemented method of claim 7 further comprising:
    while the aerial vehicles are operating in the crosswind flight:
       determining that the flight pattern of one of the aerial vehicles is not operating according to the determined asynchronous flight pattern relative to at least one other aerial vehicle;
       responsive to the determination, determining one or more adjusted flight settings for at least one of the aerial vehicles; and
       operating the at least one aerial vehicle according to the one or more adjusted flight settings.

11. A computer implemented method comprising:
    determining a deployment order for two or more aerial vehicles, wherein each aerial vehicle is configured to operate substantially along a respective flight path to generate electrical power, wherein each of the aerial vehicles is coupled to a respective separate ground station through a respective tether, and wherein each ground station is coupled to a common ground power unit;
    assigning the deployment order to the two or more aerial vehicles;
    deploying the two or more aerial vehicles according to the assigned deployment order, wherein deploying the two or more vehicles according to the assigned deployment order comprises:
       for an aerial vehicle in a first position of the deployment order, (i) deploying the aerial vehicle, (ii) operating the aerial vehicle in a loitering flight;
       for each aerial vehicle in the assigned deployment order between the aerial vehicle in the first position of the deployment order and an aerial vehicle in a last position of the deployment order, (i) determining that the preceding aerial vehicle in the assigned deployment order is operating in the loitering flight, (ii) deploying the aerial vehicle (iii) operating the aerial vehicle in a loitering flight;
       for the aerial vehicle in the last position of the deployment order, (i) determining that the preceding aerial vehicle in the assigned deployment order is operating in the loitering flight, (ii) deploying the aerial vehicle, (iii) operating the aerial vehicle in a crosswind flight.

12. The computer implemented method of claim 11, wherein operating the aerial vehicle in the loitering flight comprises:

determining a respective loitering flight path for the aerial vehicle;

operating the aerial vehicle according to its respective loitering flight path, wherein the aerial vehicle operating according to its respective loitering flight path generates a power, wherein the generated power is substantially equivalent to a power needed to operate the aerial vehicle in the loitering flight.

13. The computer implemented method of claim 11 further comprising:

determining that the aerial vehicle in the last position of the deployment order is operating in the crosswind flight;

responsive to the determination, operating the aerial vehicles in a crosswind flight.

14. A system comprising:

a shared ground power unit, wherein the shared ground power unit comprises a battery system and a grid connection;

two or more airborne wind turbines (AWTs), wherein each AWT comprises:

a tether coupled to a ground station, wherein the ground station is coupled to the shared ground power unit; and an aerial vehicle coupled to the tether, wherein the aerial vehicle is configured to operate in crosswind flight to generate electrical power.

15. The system of claim 14, wherein the battery system is configured to:

transmit a stored power to at least one of the two or more AWTs;

receive a generated power from at least one of the two or more AWTs.

16. The system of claim 14, wherein each AWT is configured to deploy the two or more aerial vehicles according to an assigned deployment order.

17. The system of claim 14, wherein the aerial vehicle of each AWT is operated according to a determined asynchronous pattern.

18. The system of claim 17, wherein the aerial vehicle of each AWT comprises a control system configured to:

determine that the aerial vehicle is not operating according to the determined asynchronous pattern;

responsive to the determination, determine one or more adjusted flight settings for the aerial vehicle; and operate the aerial vehicle according to the determined one or more adjusted flight settings.

* * * * *